(12) United States Patent
Johnsen

(10) Patent No.: US 9,828,758 B2
(45) Date of Patent: Nov. 28, 2017

(54) SEWER SYSTEM

(71) Applicant: Asle Johnsen, Vear (NO)

(72) Inventor: Asle Johnsen, Vear (NO)

( * ) Notice: Subject to any disclaimer, the term of this patent is extended or adjusted under 35 U.S.C. 154(b) by 0 days.

(21) Appl. No.: 15/034,545

(22) PCT Filed: Nov. 6, 2014

(86) PCT No.: PCT/NO2014/050211
§ 371 (c)(1),
(2) Date: May 4, 2016

(87) PCT Pub. No.: WO2016/072857
PCT Pub. Date: May 12, 2016

(65) Prior Publication Data
US 2016/0348351 A1    Dec. 1, 2016

(30) Foreign Application Priority Data

Nov. 6, 2013 (NO) .................................... 20131476
Sep. 15, 2014 (NO) .................................... 20141121

(51) Int. Cl.
| | | |
|---|---|---|
| E03F 3/02 | (2006.01) | |
| E03F 1/00 | (2006.01) | |
| E03F 5/02 | (2006.01) | |
| F16K 1/14 | (2006.01) | |
| F16K 31/22 | (2006.01) | |
| E03F 5/10 | (2006.01) | |

(52) U.S. Cl.
CPC ................ *E03F 3/02* (2013.01); *E03F 1/00* (2013.01); *E03F 5/02* (2013.01); *F16K 1/14* (2013.01); *F16K 31/22* (2013.01); *E03F 5/10* (2013.01)

(58) Field of Classification Search
CPC ....... E03F 1/00; E03F 3/00; E03F 3/02; E03F 5/10; E03F 5/02; F16K 1/14; F16K 31/22
See application file for complete search history.

(56) References Cited

U.S. PATENT DOCUMENTS 3,688,791 A    9/1972  McKinnon

FOREIGN PATENT DOCUMENTS

| DE | 575 65 B1    | 2/1984 |
| DE | 3617284 A1   | 11/1986 |
| DE | 4032235 A1   | 5/1991 |
| DE | 40 07 282 A1 | 9/1991 |
| EP | 1 172 491 A2 | 1/2002 |
| FR | 2567934 A1   | 1/1986 |
| FR | 2679576 A1   | 1/1993 |

(Continued)

OTHER PUBLICATIONS

English language Abstract of DE 3617284 A1.

(Continued)

*Primary Examiner* — Carib Oquendo
(74) *Attorney, Agent, or Firm* — Hershkovitz & Associates, PLLC; Abe Hershkovitz

(57) ABSTRACT

A system for and method to control and improve throughput of liquid in a sewer system utilizes a generally gas free column of sewer pipes. A single manhole has a separate section to handle waste water and a separate section to handle surface water, with pipes operatively connected to them. Valves connected to the manhole and pipes are opened and closed to prevent outlet as well as to prevent gas from entering the outlet to keep the sewer pipes filled with liquid, and fluid travels pipe-in-pipe and forms a gravity flow high capacity (full current) column.

10 Claims, 27 Drawing Sheets

(56) References Cited

FOREIGN PATENT DOCUMENTS

| JP | H08105106 A | 4/1996 |
|---|---|---|
| JP | 2001 226977 A | 8/2001 |
| JP | 2013 011088 A | 1/2013 |
| NO | 20130895 A1 | 12/2014 |
| WO | WO98/28499 | 7/1998 |
| WO | WO 00/06844 | 2/2000 |
| WO | WO 2008/091159 A1 | 7/2008 |

OTHER PUBLICATIONS

English language Abstract of DE 4032235 A1.
English language Abstract of FR 2679576 A1.
English language Abstract of JP H08105106 A.
English language Abstract of FR 2567934 A1.
International Search Report mailed on Feb. 4, 2015.
English language machine-translation of Description of DE 40 07 282 A1 (Sep. 12, 1991).
English language Abstract of JP 2001 226977 A (Aug. 24, 2001).
English language machine-translation of Description of JP 2013 011088 A (Jan. 17, 2013).
English language Abstract of JP 2013 011088 A (Jan. 17, 2013).
English language Abstract of WO 2014/209133 A1 (Dec. 31, 2014).
Supplementary Partial European Search Report dated Jul. 18, 2017 in corresponding European Patent Application No. 14905566.7.

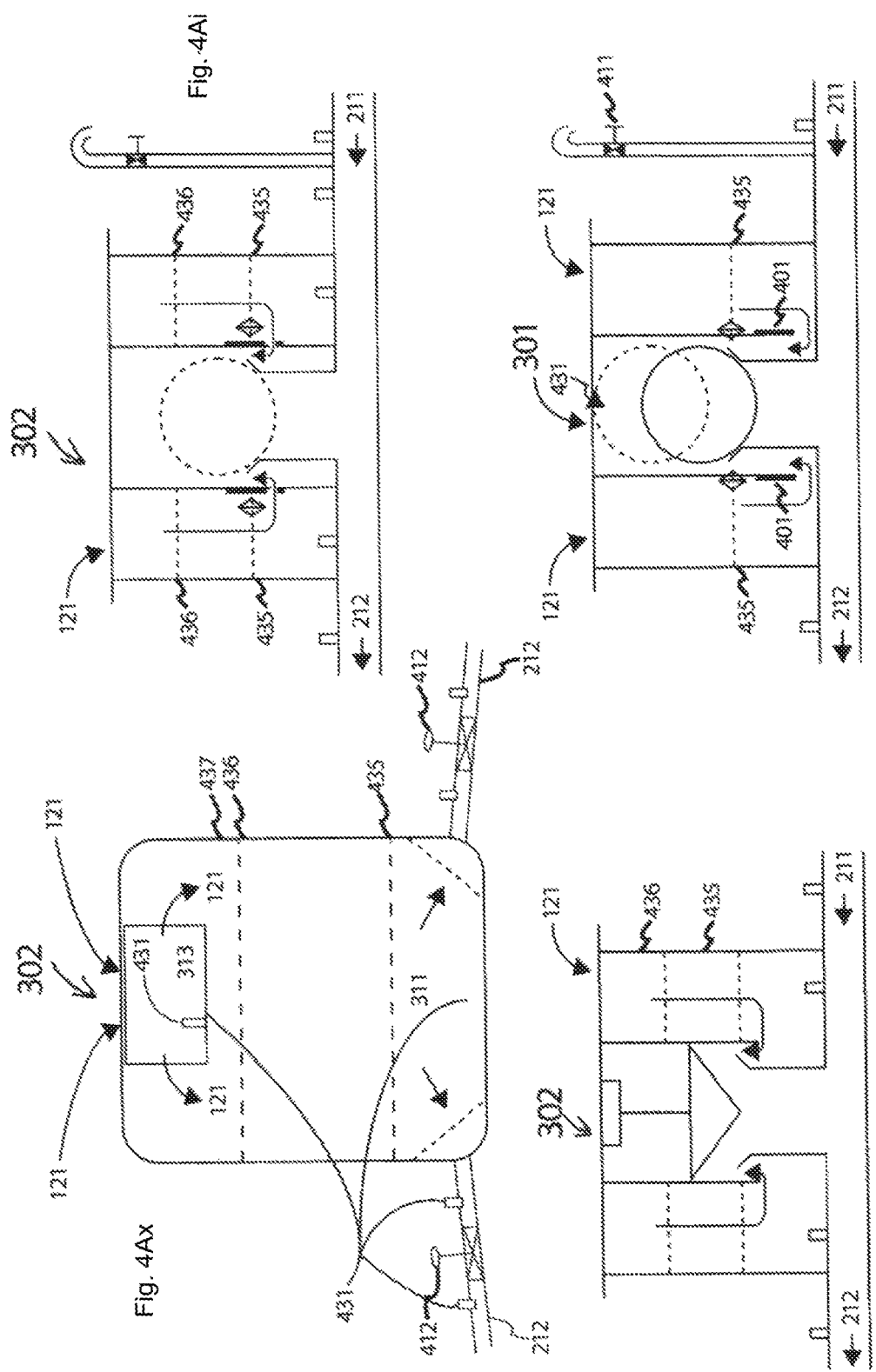

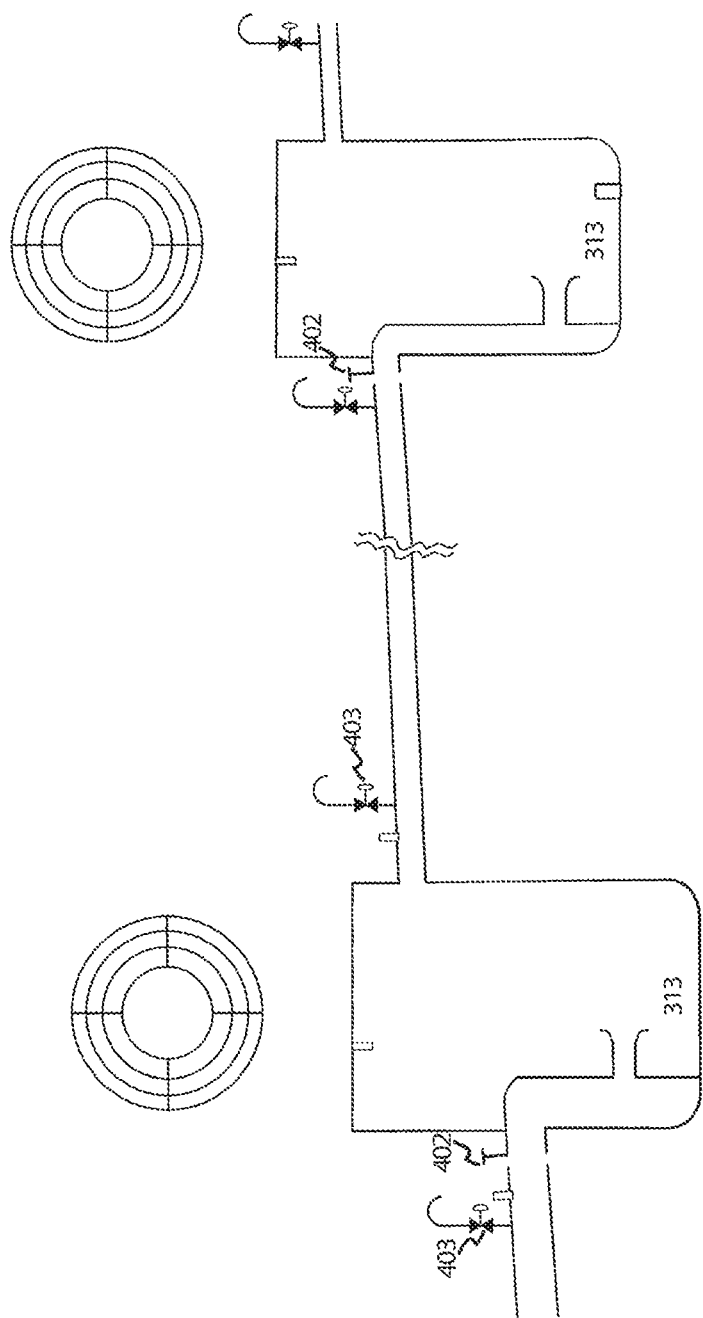

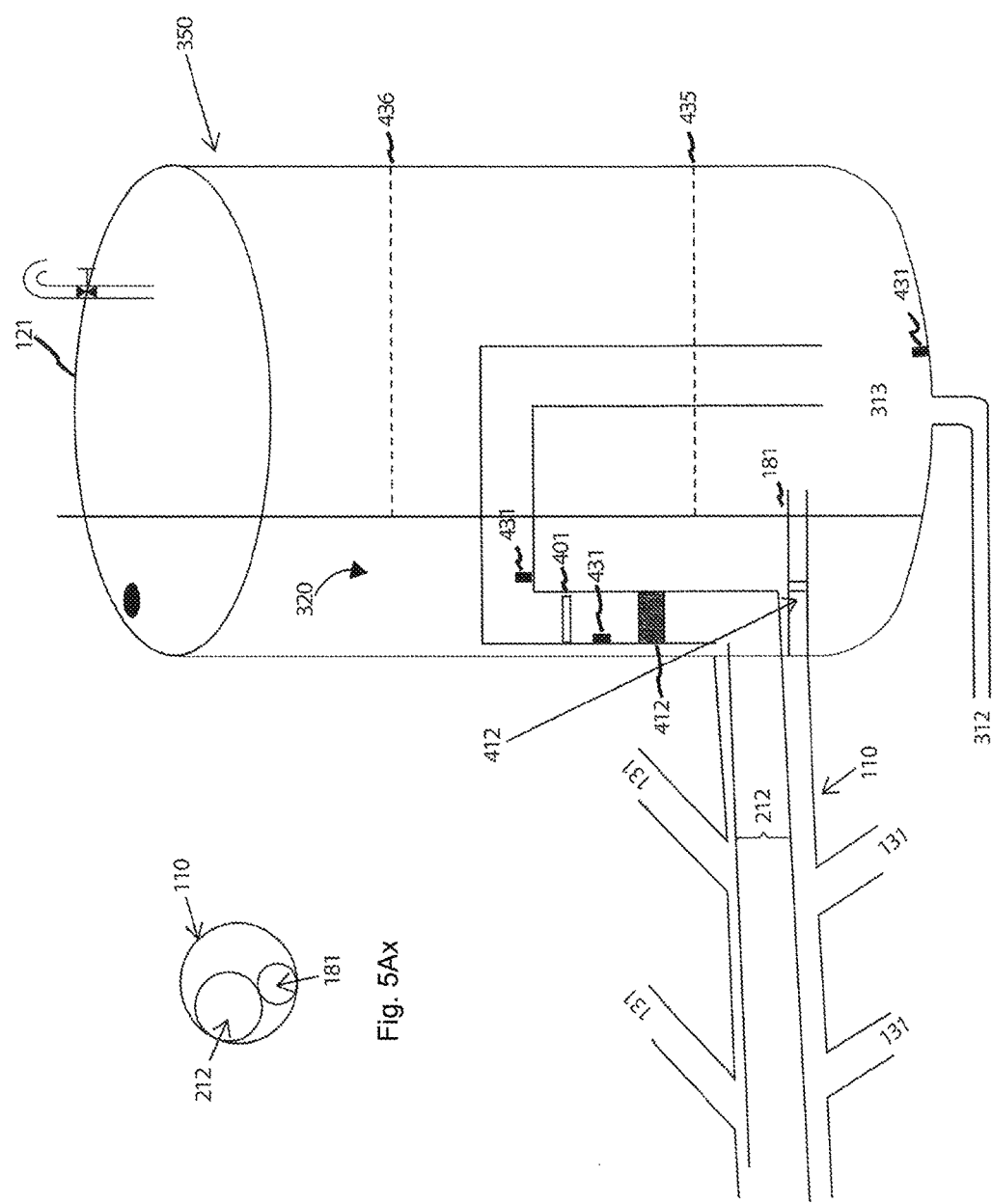

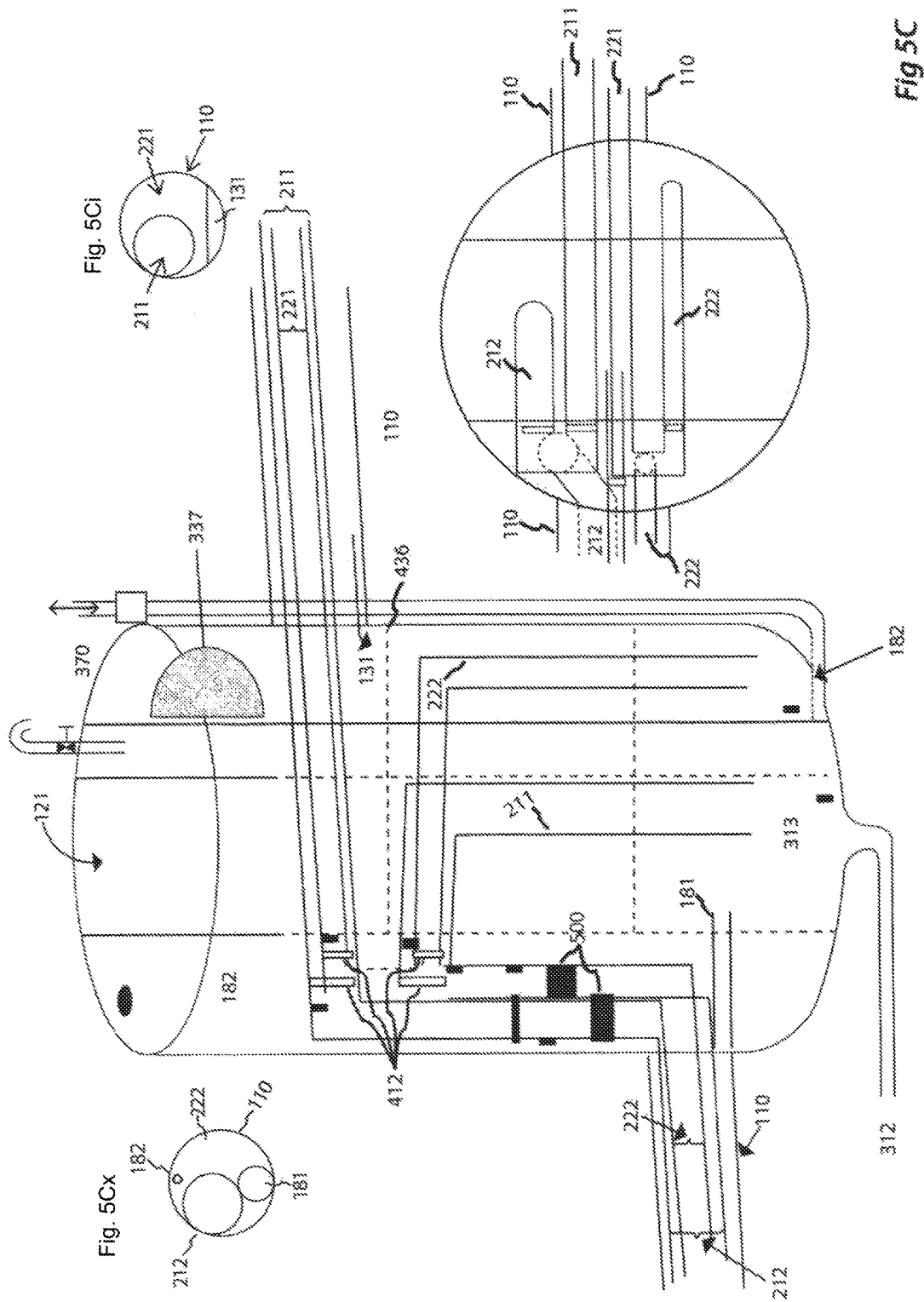

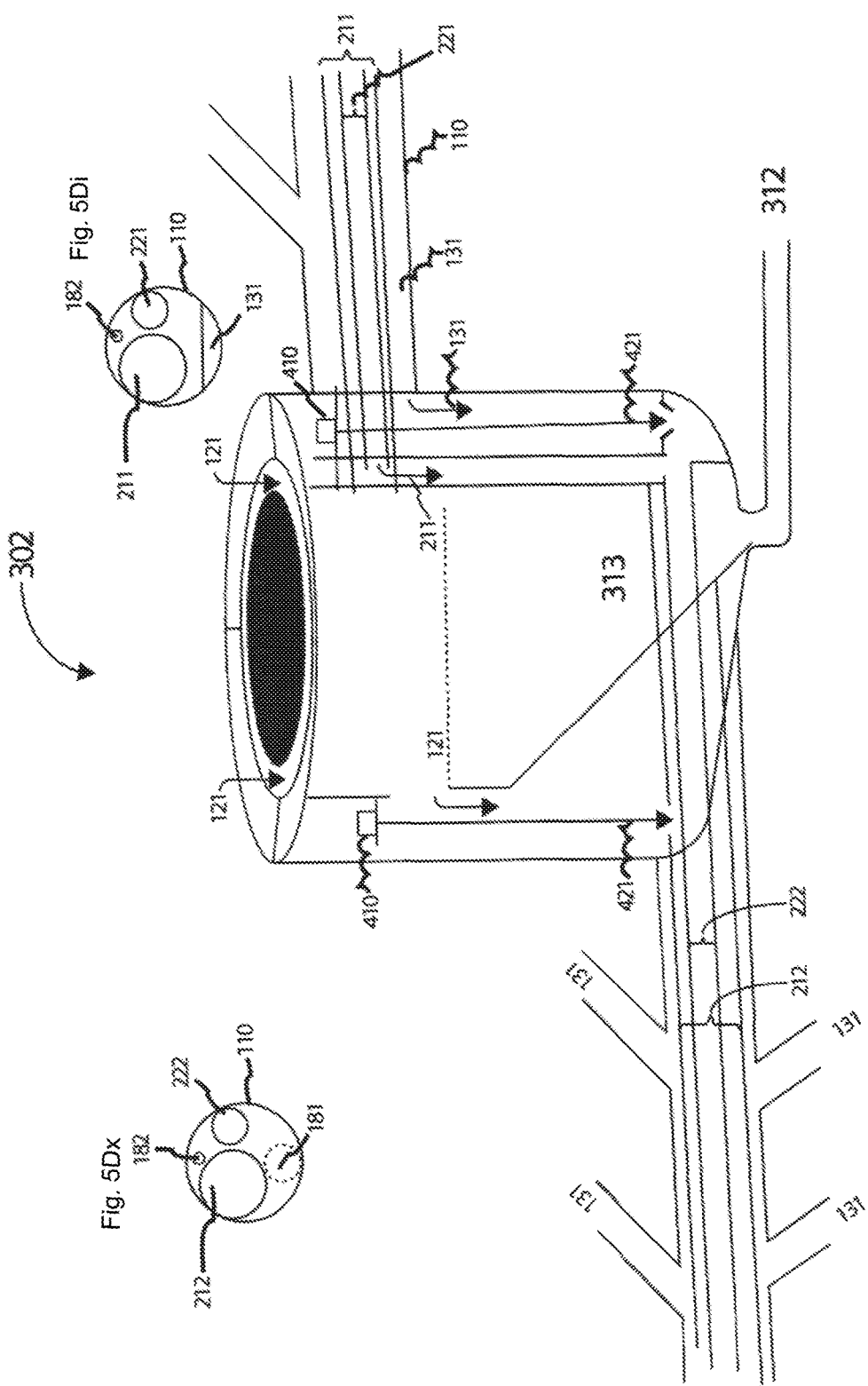

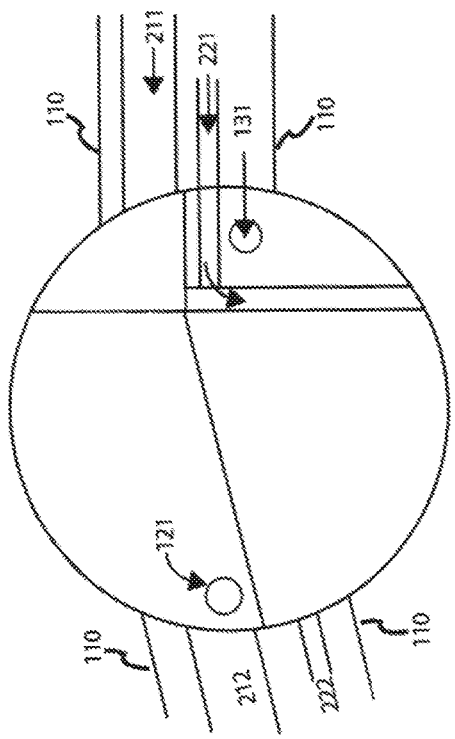
Fig. 5E
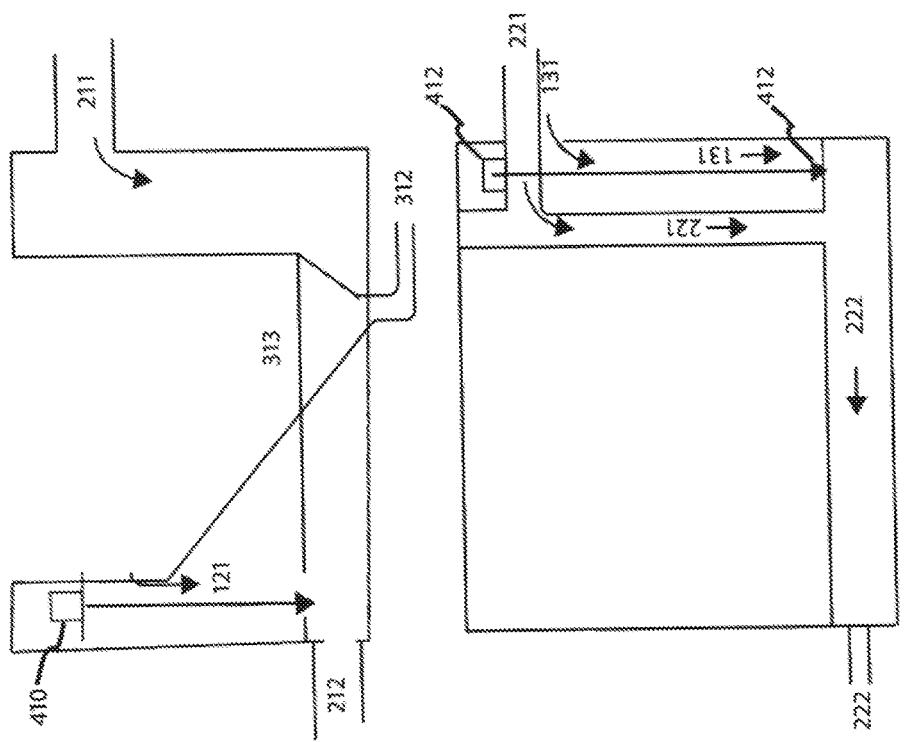
Fig. 5Ei
Fig. 5Ex

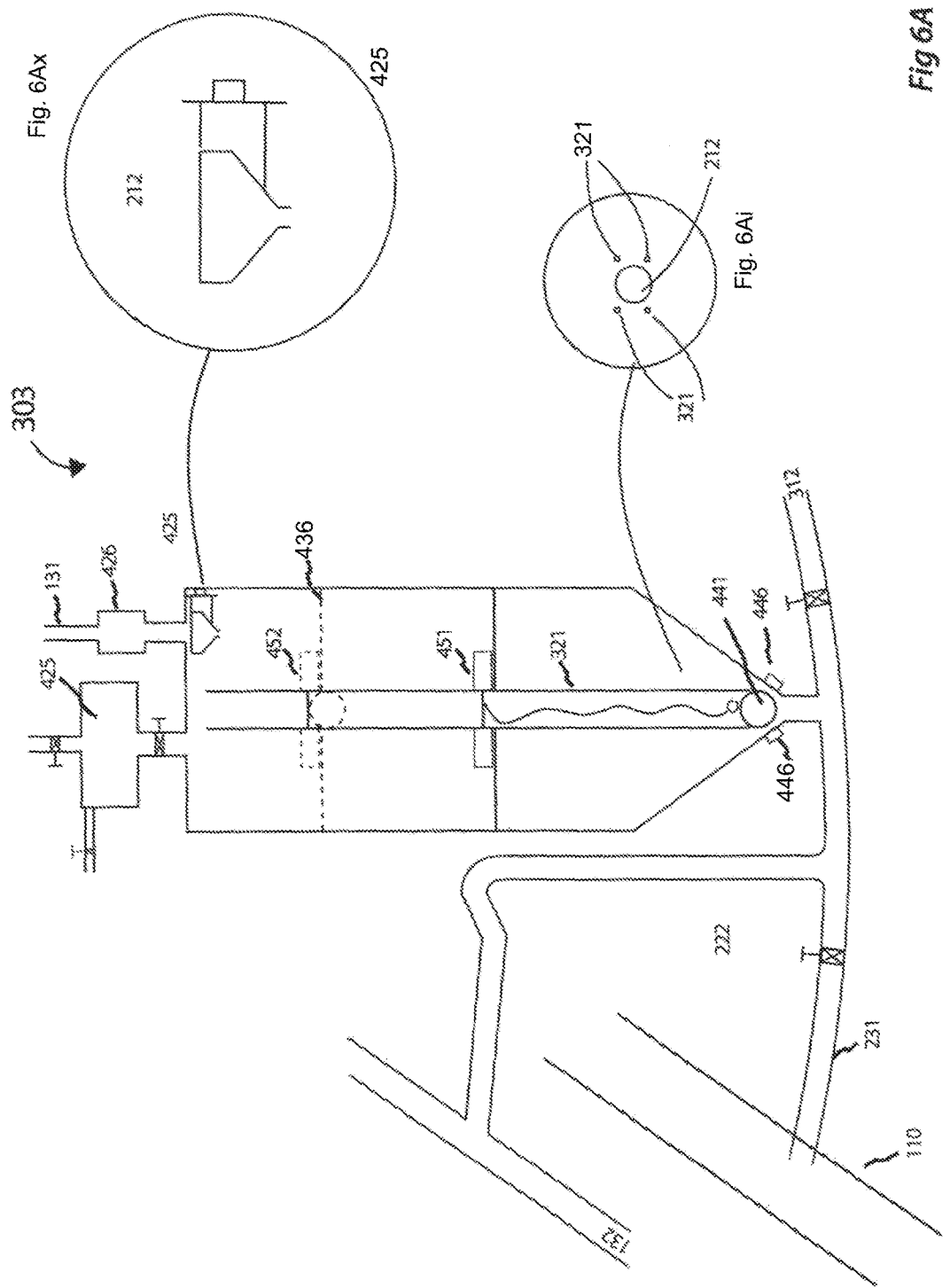

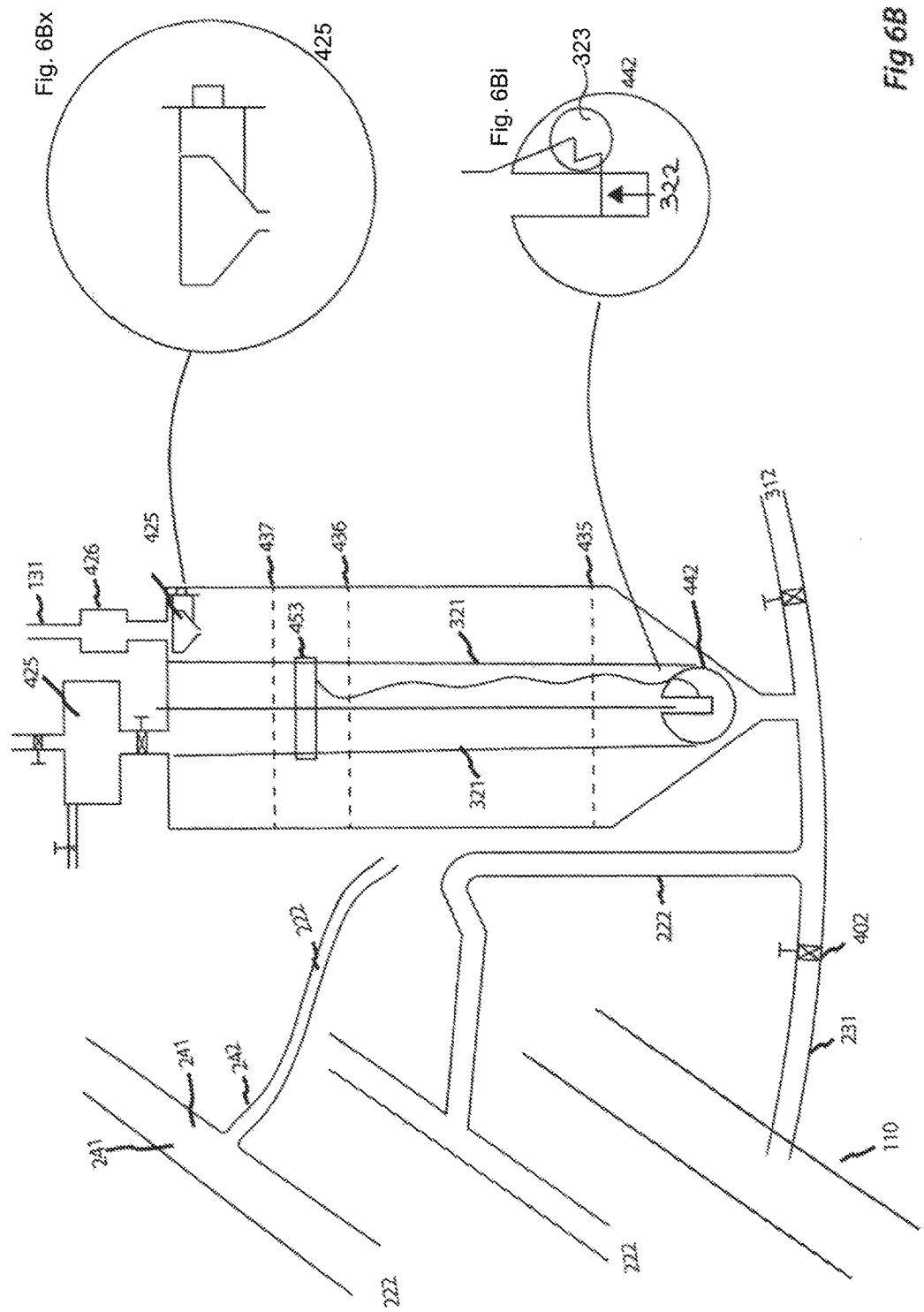

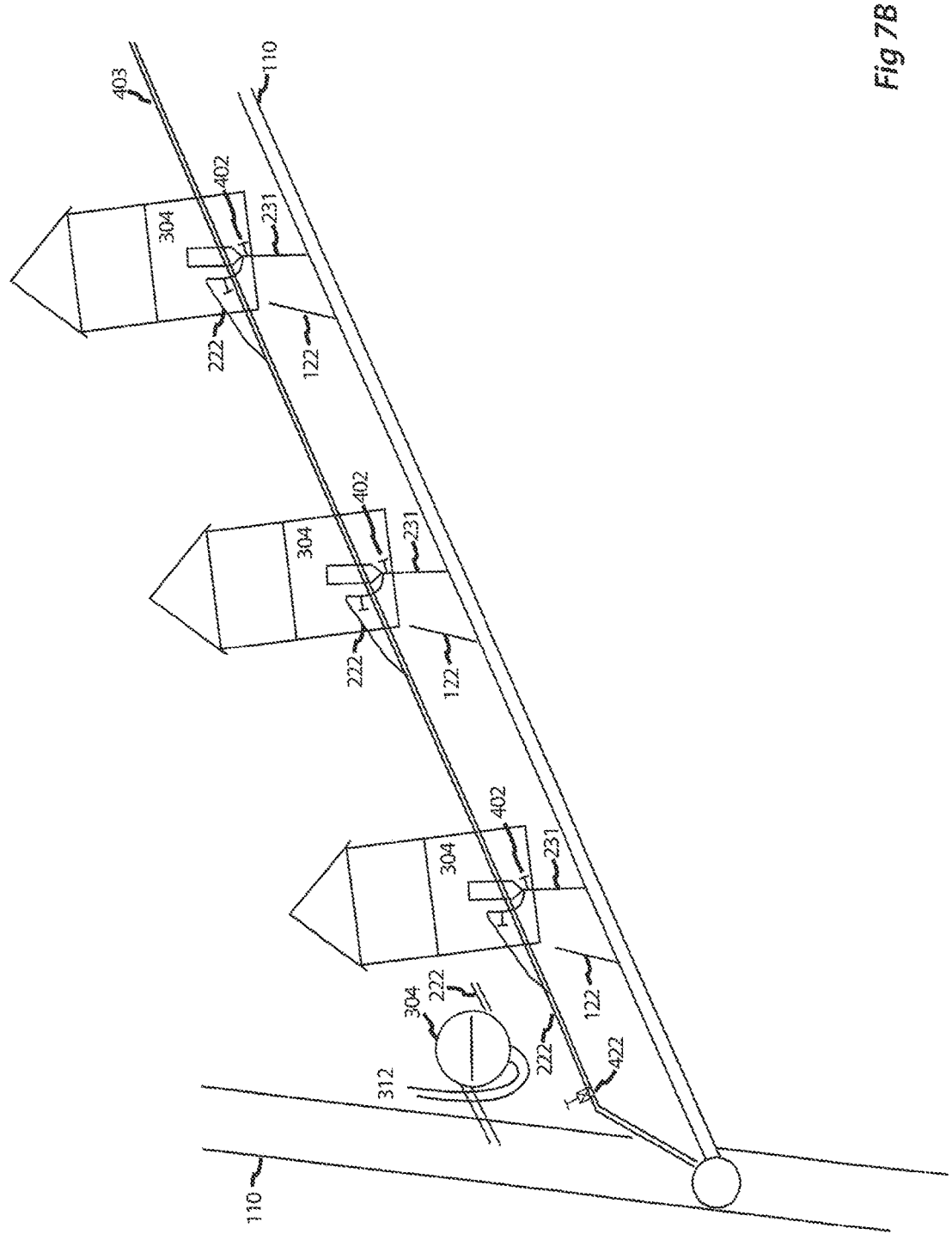

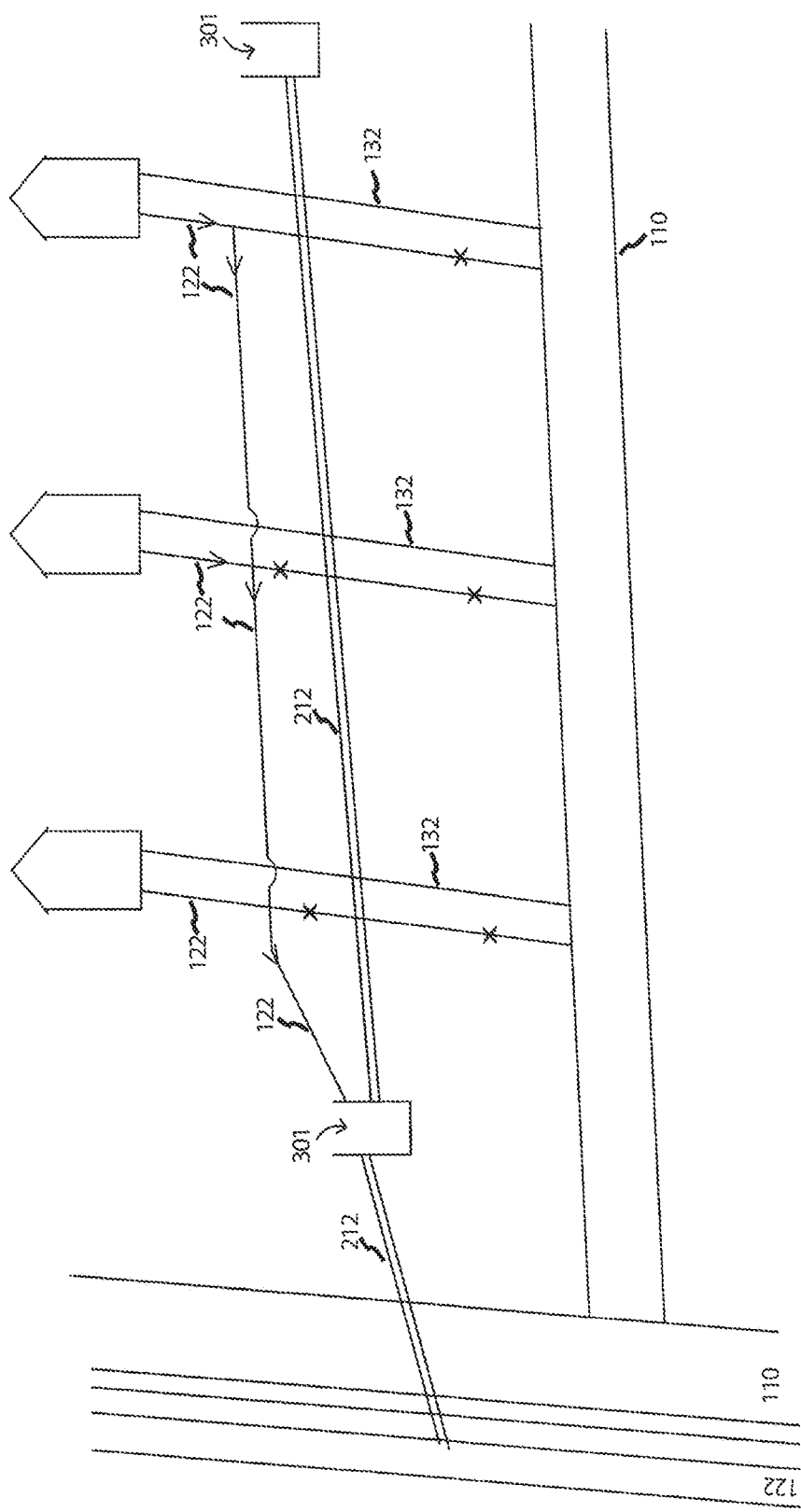

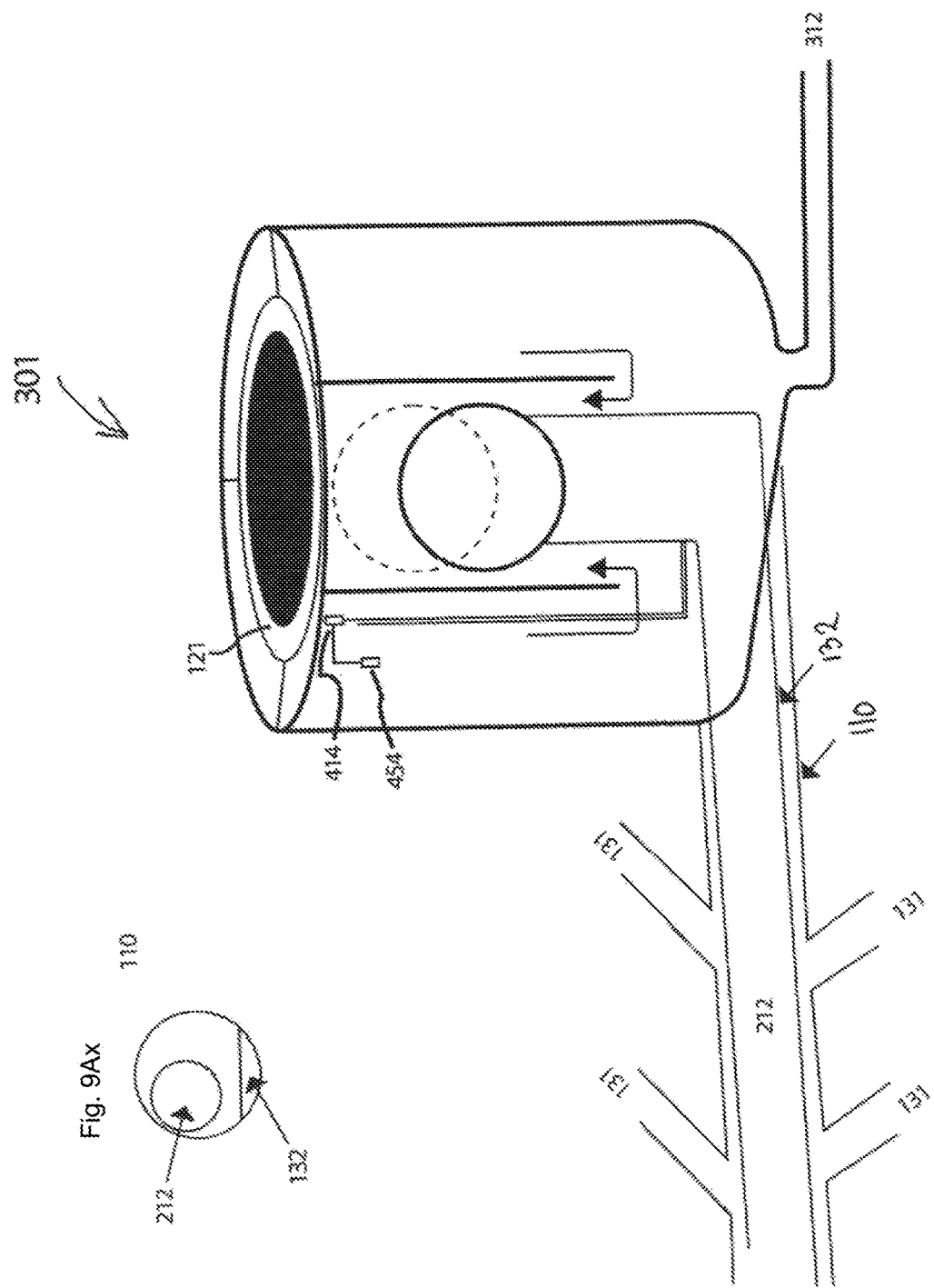

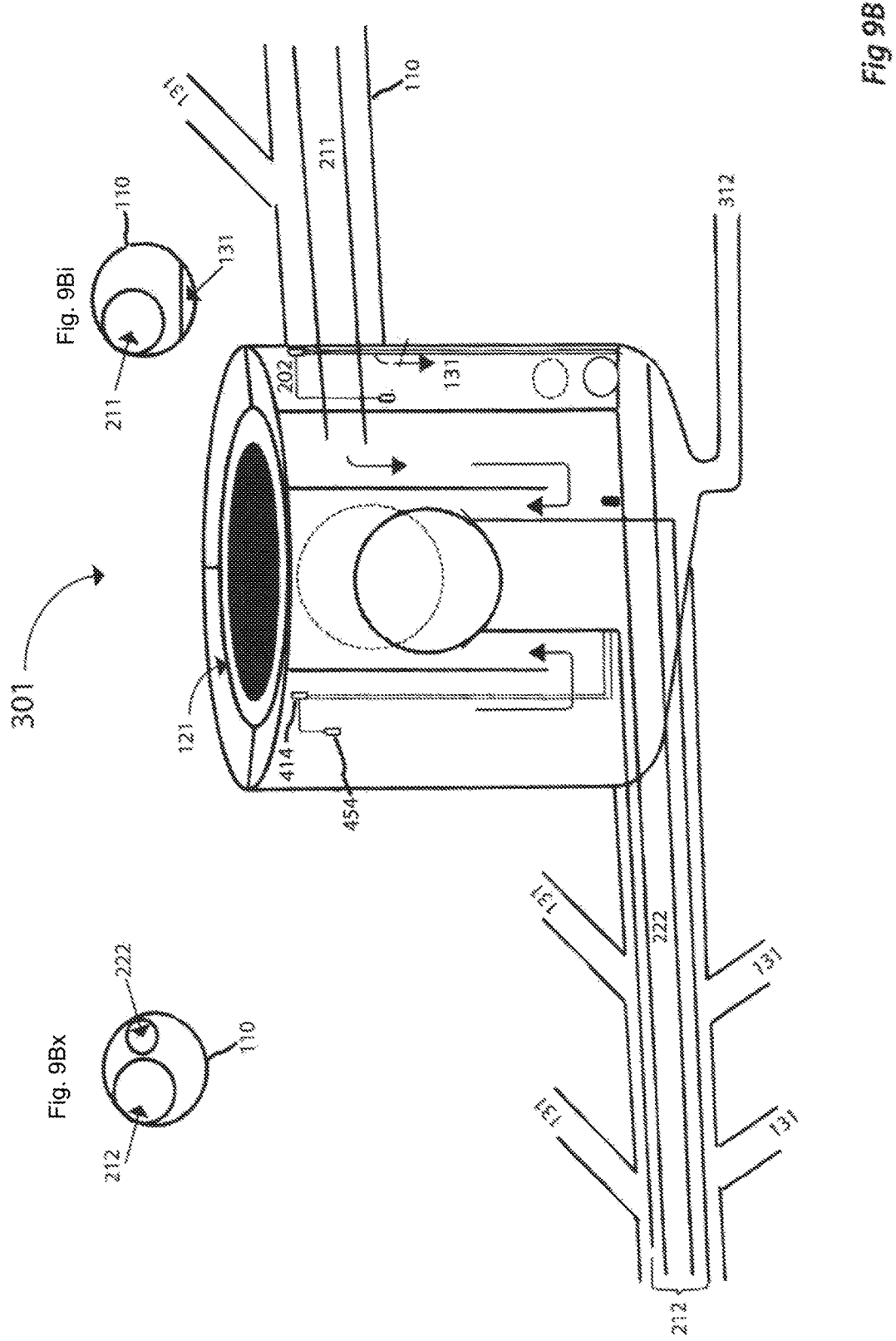

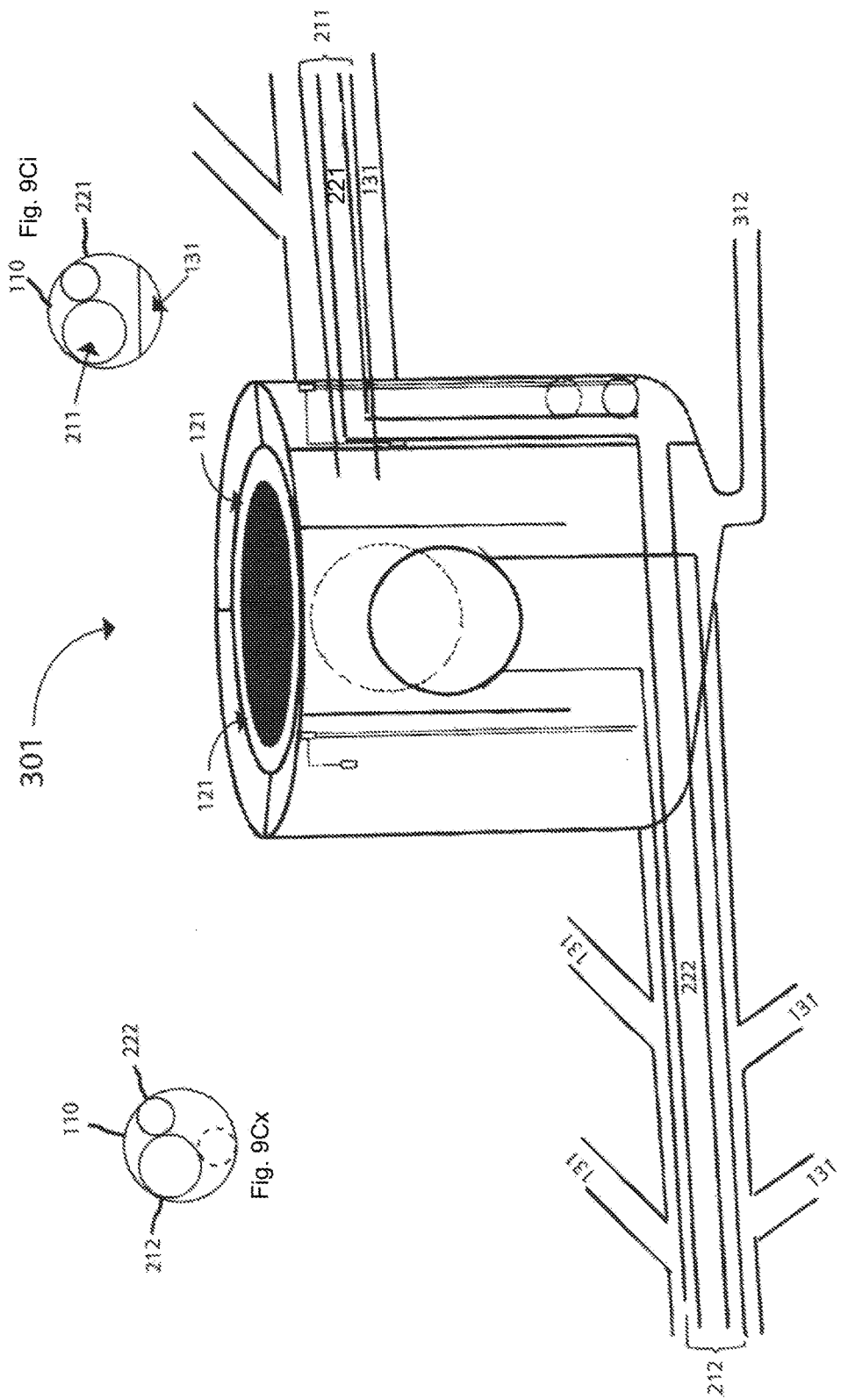

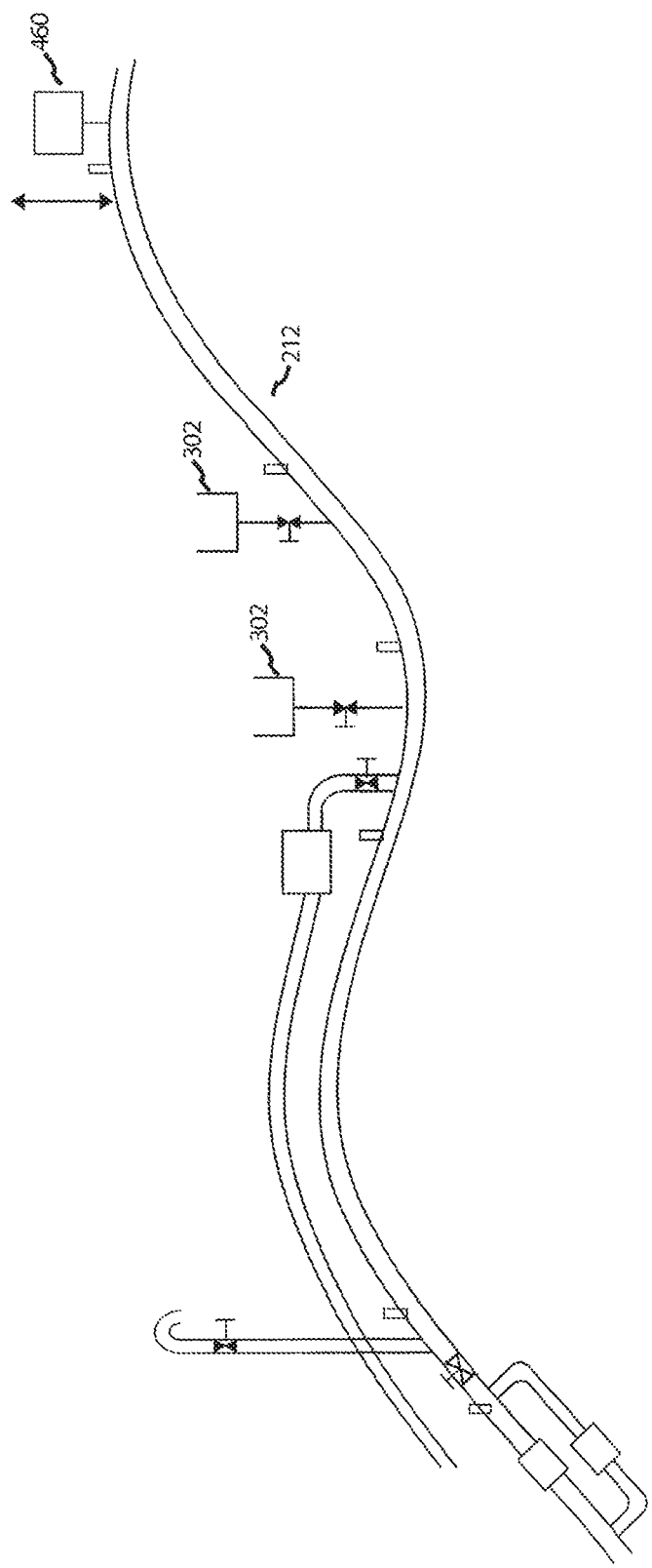

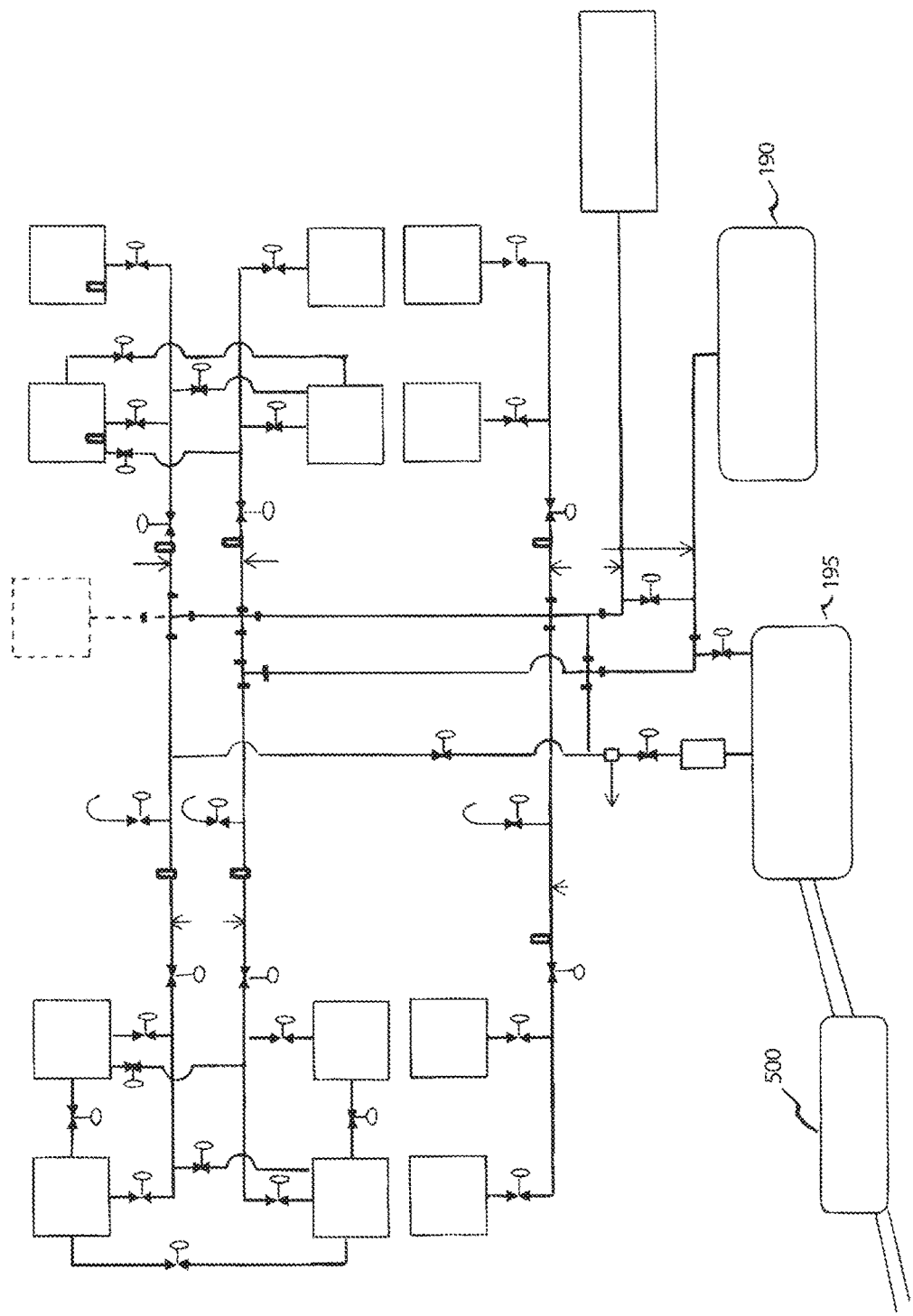

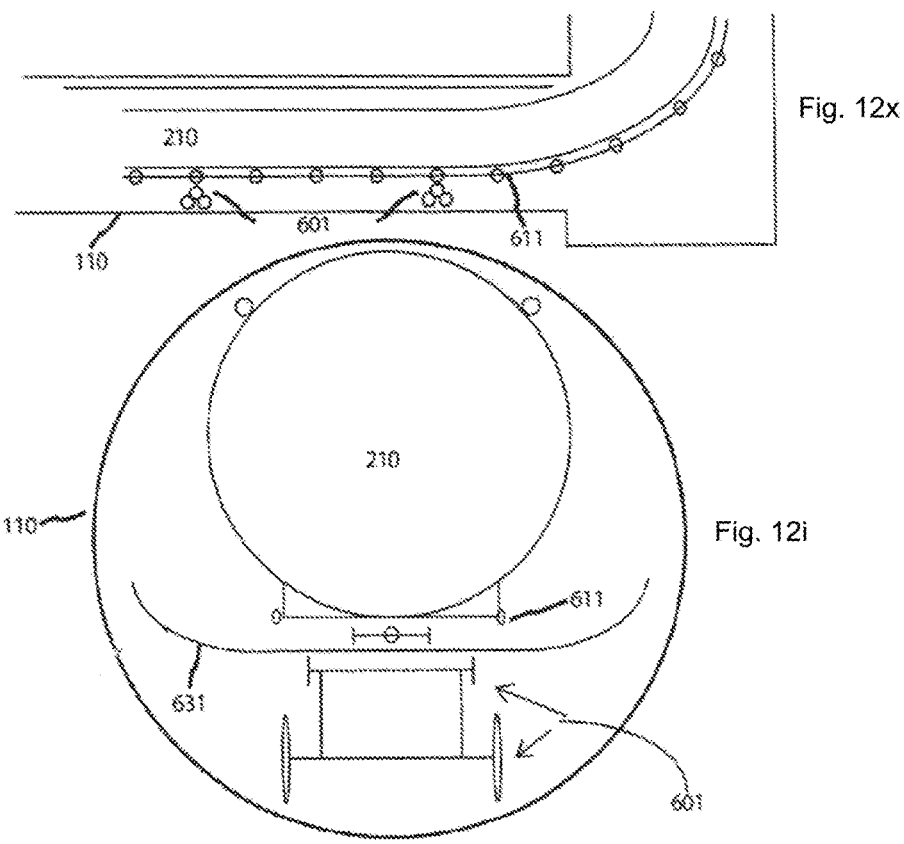
Fig. 12x
Fig. 12i
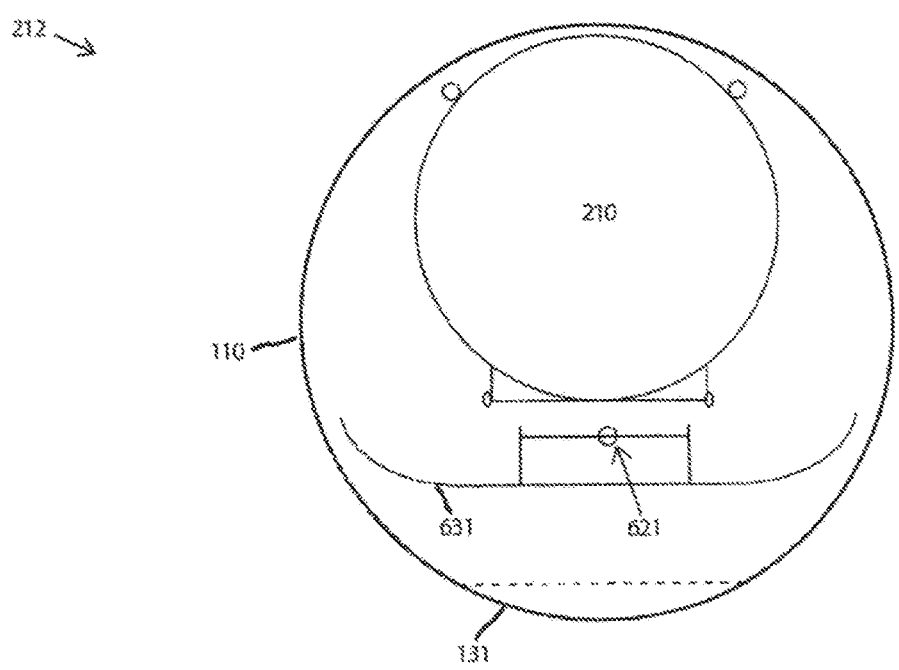
Fig 12

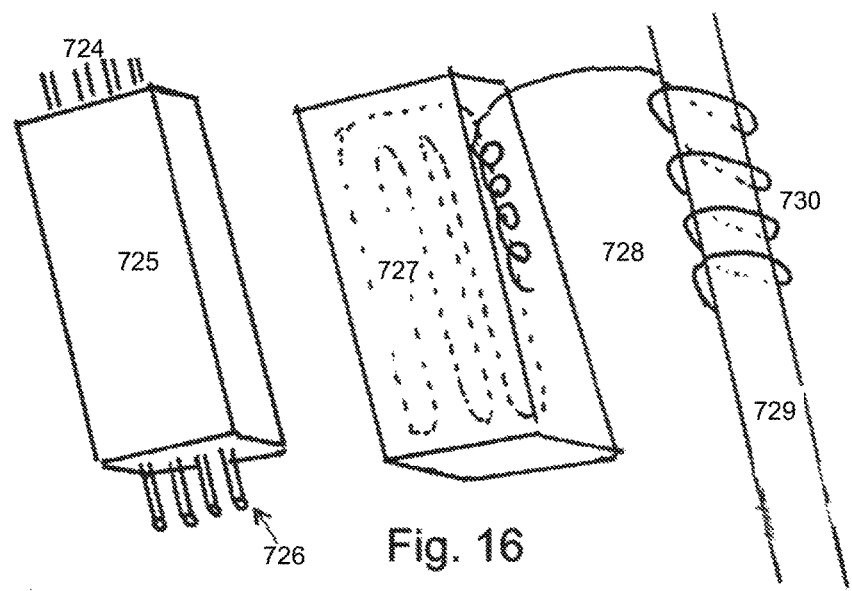
Fig. 16
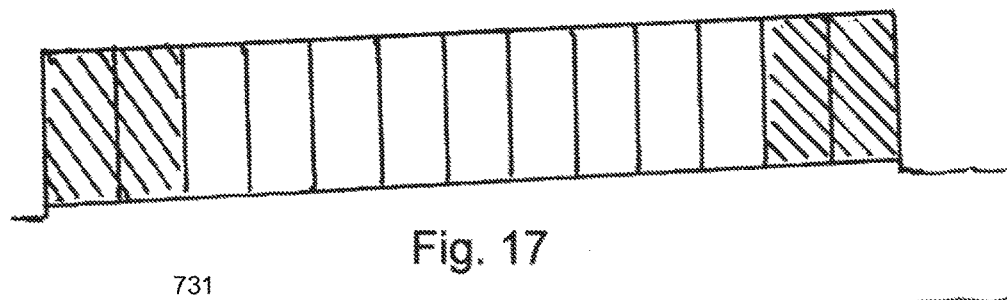
Fig. 17
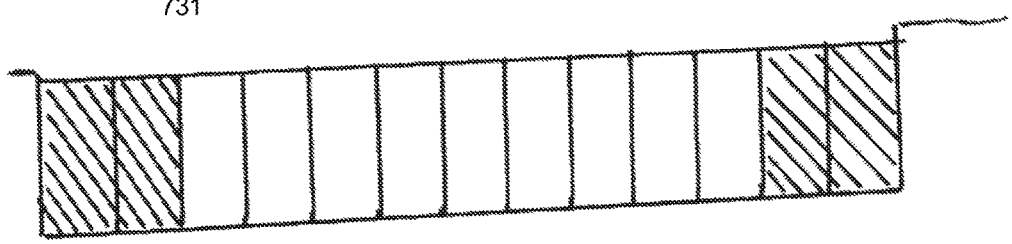
Fig. 18
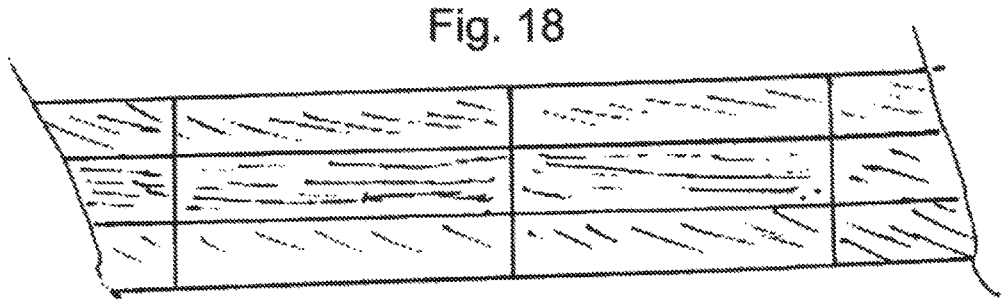

SEWER SYSTEM

TECHNICAL FIELD

The invention is related to fluid control in general and more specifically to a system for and a method to control and improve throughput of liquid in a sewer system.

BACKGROUND

Prior art refers to traditional sewer systems for use in sewer/waste water and surface water. Fluid from inlets are collected and guided, typically via one or more cesspools and collection tanks and further to an outlet where the fluid typically gets treated, such as a sewer disposal plant, before it is drained and deposited at appropriate places. Between inlets, cesspools and treatment plants are used pipes to connect, possibly also manifolds or branching-pieces connecting two or more pipes together to one pipe.

The principle is based upon liquid flowing by its own weight, and is called "gravity flow" (self-falling). Cesspools, pipes and manifolds are open and allow air to be let into the sewer system and thereby limit the amount of liquid that the system can handle. In addition, the use of cesspools presents a risk of liquid flowing from parts of a system at higher altitude flowing out from a lower inlet.

From prior art FR2567934 is known a sewer system comprising at least one cesspool. Reference is also made to WO2000/6844 regarding a cesspool suitable to clean sewer pipes. Further, DE3617284 regards control of draining of tanks or sewer pipes. Reference is also made to an ejector device in a water supply pipe for generating suction in a branch line. Finally, WO1998/28499 regards gathering lines and daily water wells.

BRIEF SUMMARY OF THE INVENTION

Previously, common drainage was laid out, i.e. waste water, drain water, roof water and surface water was guided to the outlet being a creek, river or the sea. Later on, the liquid was led into a treatment plant before it finally was let out into the recipient. During heavy precipitation, the treatment plant does not necessarily have the capacity to cope, and sewers can release untreated fluid directly into the recipient via overrun in the treatment plants. This is a big strain on the environment and is in no way acceptable in the treating of waste water. Therefore, waste water is attempted to be separated to a particular pipe to a treatment plant, and drain water and roof water directly to the recipient. Waste water may e.g. come from a road with heavy traffic and being contaminated heavily by heavy metals. In a period after a long lasting dry weather condition, there may be a need to guide the waste water via the treatment plant; when the pollution is washed away this is no longer necessary, and therefore not desirable to clean the waste water. It is very costly to dig up and lay out new separated pipes, and in many cases the dimensions of the pipes must also be increased due to increasing precipitation. Among researchers there is to a large degree a consensus that precipitation is expected to increase considerably due to global heating. Therefore, actions must therefore be performed on many pipeline networks, not only in Norway, but also generally.

Today there are a considerable number of problems with drainage systems for surface water and sewer. The systems are often old and comprehensive leaks can cause environmental problems, particularly when this penetrates the network of drinking water. Moreover, the capacity is low, but the systems nevertheless must achieve comprising fluids from development premises that have arrived after the original drainage network was laid. By extreme weather one may experience that the drainage flows over and overwhelms the treatment plants' capacity to clean the fluids before pouring them, typically to sea.

Renovation is difficult. Preferably existing drainage networks should be removed, particularly in places where cement pipes are used. Regretfully, the networks are often difficult to access and will require a considerable digging capacity.

An alternative is to draw new pipes into old pipes, preferably made by a more durable synthetic material. A problem with this is that it will reduce the actual cross section of the drainage and consequently reduce the capacity.

For this reason, a main purpose with the present invention is to provide a sewer system and a method to control a sewer system that overcomes the above problems.

The present invention is directed to a device for a sewer system including a manhole with an inlet and an outlet, a pipe operatively connected to the outlet of the manhole and a valve operatively connected to one of the pipe and the manhole, with the features of the manhole including at least one first part for surface water and at least one second part for waste water, and the valve, when closed, prevents outlet from the at least one first part so that surface water runs in a pipe-in-pipe arrangement. By the present invention, gases are prevented from entering the pipe when the water exceeds the lower level of the manhole, so the water becomes a gas-free column and the pipe becomes a full current pipe. A method for controlling a sewer system includes opening the valve when the received fluids exceed the upper level of the manhole, and closing the valve when the received fluids drop below the lower level of the manhole. A valve for a sewer system includes a valve body attached to a float body, where the buoyancy of the float body assists in releasing the valve for opening of the valve.

A number of non-exhaustive embodiments, variants or alternatives of the invention are defined in the appended claims.

The present invention achieves the aim set forth above by utilizing a full current solution in a sewer system.

The technical difference from traditional sewer systems is that the full cross section is substantially free from gas and therefore enables a full current solution instead of gravity flow.

These effects in turn bring about further advantageous effects:

- Making it possible utilizing to utilize the full cross section to the outlet
- Producing such a powerful current that this can be utilized to remove foreign matter in the pipes, such foreign matter would else have contributed to increasing the current resistance in the pipes
- Producing a siphon like effect resulting in possibility to avoid using pumps in pipe distances that slope upwards
- The weight of pipes and manholes increase and consequently buoyancy is reduced, which otherwise could tend to lift these up from the ground, particularly in old pipes from before mid 90's without ballast
- Today, the sewer network is flushed to clean and remove particularly sand and other deposits. By using full current pipes, the liquid speed will be so high that depositing will not occur and such flushing is not needed.

Wet wells are avoided in a full current system. To operate pumps requires energy and maintenance. Wear and tear is heavy due to sand in the systems.

It is possible to simplify and safeguard the electrical installation by using 24V motor valves instead of 230V pumps, also simplifying matter with emergency current in case of power failure.

The temperature within the pipe is kept more stable, resulting in reduced wear and tear due to thermal expansion and contraction.

In traditional manholes, a siphon effect is actively counteracted because such manholes are prepared with anti-siphon valve by emptying downwards.

BRIEF DESCRIPTION OF THE DRAWINGS

The invention will now be described with reference to the drawings presenting several embodiments, and where FIG. 1 schematically presents parts of a sewer system according to prior art FIG. 2 schematically presents parts of a sewer system in cross section according to prior art FIG. 3 schematically presents parts of a sewer system according to the invention FIGS. 4a, 4Ax, 4Ai, 4aj and 4b schematically present parts of a sewer system in cross section according to the invention FIG. 5 schematically presents a manhole according to the invention FIG. 5A schematically presents an up stream manhole for surface water FIGS. 5AX and 5AI schematically presents cross sections of outlet and inlet in FIG. 5A, respectively FIG. 5B schematically presents an up stream manhole for waste water FIGS. 5BX and 5BI schematically presents cross sections of outlet and inlet in FIG. 5B, respectively FIG. 5C schematically presents a downstream manhole for waste water FIGS. 5Cx and 5Ci schematically present cross sections of outlet and inlet in FIG. 5C, respectively FIG. 5D schematically presents a bisected manhole for waste water and surface water FIGS. 5Dx and 5Di schematically presents cross sections of the manhole in FIG. 5D, respectively FIG. 5E schematically presents a bisected manhole for waste water and surface water FIGS. 5Ex and 5Ei schematically presents cross sections of the manhole in FIG. 5E, respectively FIG. 6a schematically presents a sewer manhole for a house with a buoyancy valve according to the invention FIG. 6Ax schematically presents cistern for flushing FIG. 6Ai schematically presents arrangement to steer a ball FIG. 6b schematically presents schematically presents sewer manhole for house with motor valve according to the invention FIG. 6Bx schematically presents cistern of flushing FIG. 6Bi schematically presents motor controlled sealing valve with buoyancy and trigger FIG. 7a schematically presents a first example of a network according to the invention FIG. 7b schematically presents a second example of a network according to the invention FIG. 7c schematically presents a third example of a network according to the invention FIG. 8 schematically presents an example of a pipe with a narrow passage FIG. 9A, FIG. 9B and FIG. 9C schematically present a manhole with a flotation valve in the shape of a ball FIG. 9Ax schematically presents a cross section of a common pipe for over water/spill water of FIG. 9A FIG. 9Bx and FIG. 9Bi schematically presents a cross section of a common pipe for over water/spill water of FIG. 9B FIG. 9Cx and FIG. 9Cx schematically presents a cross section of a common pipe for over water/spill water of FIG. 9C FIG. 10 schematically presents a sewer system having a counter fall FIG. 11 schematically presents a composite sewer system having circuits for black water, grey water and environmentally toxic materials FIG. 12, FIG. 12x and FIG. 12i schematically present a sewer system comprising a pipe-in-pipe system FIG. 13 schematically presents a full current manhole FIG. 14 schematically presents an inset in a manhole FIG. 15 schematically presents a bridge with vacuum suction to suck water away FIG. 15x schematically presents a cross section of vacuum suction device FIG. 16 schematically presents a spill water heated pavement FIG. 17 schematically presents an embodiment of a heated pavement FIG. 18 schematically presents an embodiment of a heated car park

REFERENCE NUMBERS REFERRING TO DRAWINGS

Figure 1:
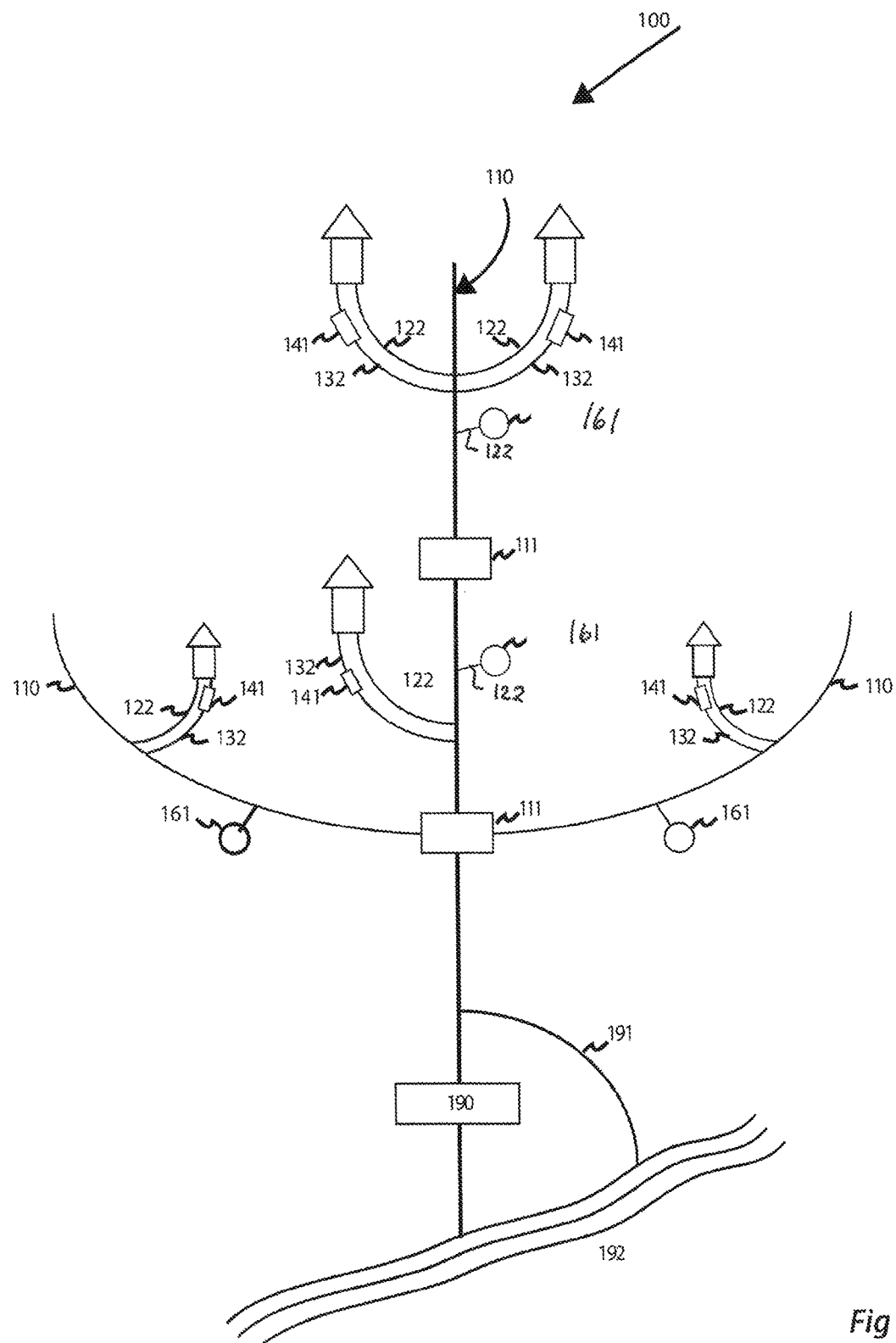

| | |
|---|---|
| 100 | Sewer system - gravity flow |
| 110 | Common pipe for over water/spill water |
| 111 | Manhole on common pipe |
| 113 | Mixture of over water and waste water |
| 120 | Over water - gravity flow |
| 121 | Over water IN - gravity flow |
| 122 | Over water OUT - gravity flow |
| 123 | Purified waste water |
| 130 | Waste water - gravity flow |
| 131 | Waste water IN - gravity flow |
| 132 | Waste water OUT - gravity flow |
| 141 | Sewer/waste water manhole for house |
| 161 | Manhole for over water - gravity flow |
| 181 | Flush pipe |
| 182 | Current/current control cable |
| 190 | Cleaning plant |
| 191 | Spillway |
| 192 | Lake, river (Recipient) |
| 195 | Surface water basin |
| 200 | Sewer system vacuum - full current |
| 201 | Surface water manhole - vacuum |
| 202 | Waste water manhole - vacuum |
| 210 | Pipe inside common pipe 110 |
| 211 | Surface water IN - vacuum |
| 212 | Surface water OUT - vacuum |
| 221 | Waste water IN - vacuum |
| 222 | Waste water OUT - vacuum |
| 231 | Spare output to common pipe 110 (normally closed) |
| 240 | Venturi effect unit |
| 241 | Narrow passage of pipe |
| 242 | Pipe with under pressure and sucking liquid |
| 300 | Manholes |
| 301 | Control less vacuum manhole |
| 302 | Vacuum manhole with control/electronics |
| 303 | Waste water manhole without control - Vacuum |
| 304 | Waste water manhole with control - Vacuum |
| 306 | Mud pond |

| | |
|---|---|
| 311 | Air lock |
| 312 | Outlet for mud sucking |
| 313 | Sand trap |
| 315 | Overrun from surface water to waste water |
| 320 | Technical housing |
| 321 | Pole |
| 322 | Splint |
| 323 | Valve control unit |
| 335 | Canvas or perforated sheet |
| 337 | Cover preventing surface water flow to waste water manhole |
| 341 | Motor valve |
| 350 | Upstream manhole for surface water |
| 360 | Upstream manhole for waste water |
| 370 | Downstream manhole for waste water |
| 400 | Adjustment device |
| 401 | Manual adjustment device |
| 402 | Manual adjustment/closing valve |
| 403 | Manual air escape cock |
| 410 | Motor valve |
| 411 | Adjustment/closing valve IN surface water |
| 412 | Adjustment/closing valve OUT surface water |
| 413 | Adjustment air in and out |
| 414 | Valve air in |
| 421 | Adjustment/closing valve IN waste water |
| 422 | Adjustment/closing valve OUT waste water |
| 423 | Grating/funnel for securing of outlet |
| 425 | Cistern for flushing |
| 426 | Grinder for waste water intake |
| 430 | Level measurement |
| 431 | Sensors |
| 435 | Lower limit |
| 436 | Upper limit |
| 437 | Alarm limit triggering safeguarding actions |
| 441 | Magnetically sealed valve with buoyance (ball) |
| 442 | Motor controlled sealing valve with buoyance and trigger |
| 446 | Magnets |
| 451 | Float for lifting of ball 441 |
| 452 | Float for trigging of ball |
| 453 | Float for trigging of valve so that the float improves sealing of valve so that the buoyance raises the sealing arrangement (e.g. 10-15 cm) |
| 454 | Buoyance for releasing of valve |
| 460 | Stand by tank |
| 500 | Generator |
| 600 | Device to fasten pipe in pipe |
| 601 | Car with wheels up and down |
| 611 | Carrier frame clapped |
| 612 | Carrier frame extended |
| 621 | Tension adjuster |
| 631 | Support leg |
| 700 | Road |
| 701 | Valve |
| 702 | Self fall water in |
| 703 | Air |
| 704 | Full current out |
| 705 | Falling Riser |
| 706 | In |
| 707 | Out |
| 708 | Liner in shaft |
| 709 | Air lock |
| 710 | Water |
| 711 | Watter + sand (self fall) |
| 712 | Finishing nail |
| 713 | Sand |
| 714 | Rest volume |
| 715 | Old pipe |
| 716 | Full current |
| 717 | Bridge |
| 718 | Pier |
| 719 | High water level |
| 720 | Glass fibre |
| 721 | Concrete |
| 722 | Outlet |
| 723 | Air |
| 724 | Waste water |
| 725 | Elements |
| 726 | To next element |
| 727 | Heat pipe |
| 728 | Heat exchanger |
| 729 | Waste water |
| 730 | Full current or self fall |
| 731 | Parking lot |

DETAILED DESCRIPTION OF THE INVENTION

The invention will now be described in more detail with reference to the drawings that show more embodiments and where FIG. 1 schematically presents parts of a sewer system 100 according to prior art, comprising several inlets 122 for surface water and inlets 132 for waste water with sewer/waste water manhole 141 from each flat in a residential area and running out to a common pipe 110 for surface water/waste water with manholes 111 on this common pipe ending in a cleaning plant 190. The sewage may further be arranged with manholes 161 for surface water, e.g. from draining of roads.

The cleaning plant 190 receives waste water through pipes for sewage or waste water 110, cleans this and sends cleaned sewage/waste water to a recipient 192, typically a river or a lake. A spillway 191 can guide the liquid outside the cleaning plant 190 directly to the recipient. It is desirable to avoid sending waste water to a cleaning plant since this often van be sent directly to the recipient 192.

Figure 2:
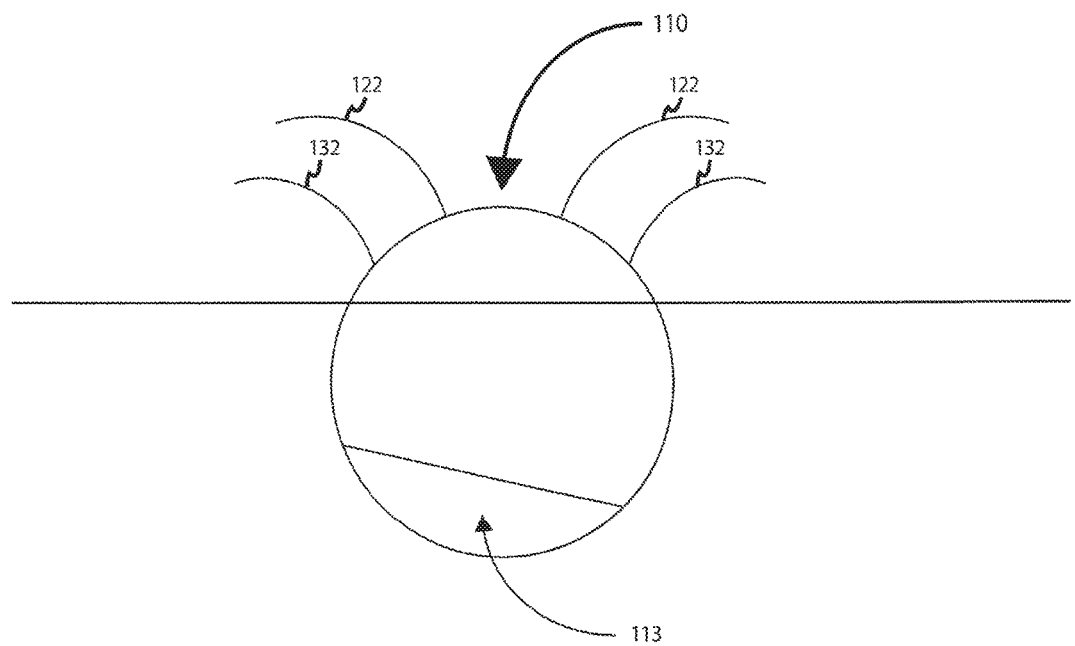

The infrastructure, comprising pipes and manholes, are normally open to air, and the flow of waste therefore is a multi-phase system. This is shown in FIG. 2 in which large parts of pipes 110 and manholes are filled with air.

A first phase is gas that is mainly air, but also other gases such as toxic hydrogen sulphide is common. Due to the fact that the infrastructure often is performed in cement or concrete there is often considerable leaks. This means that liquid leaks out and air penetrate into such systems.

Another phase is liquid, usually to a large extent water. Surface water shall to a large extent be water, but in sewer there are also other substances. Sewer and waste water shall preferably not be mixed, among other reasons in order to avoid the cleaning plants getting overwhelmed by large volumes. This happens in practice, partly due to faulty connections and partly due to surface water flowing over to the sewer-outlet during large waterfall.

A third phase is solid particles of different densities. Chipping of cement and concrete easily fall to the bottom of the infrastructure, while wood floats. In addition to this are a number of other things like paper.

Flow in sewer systems vary to a large extent, the waste water depends on precipitation, particularly rain, while sewer to a large degree is dependent on time of day. Sewer is generated to a large degree in living areas in the morning, at workplaces through the day and again in living areas after the end of the working day.

Flow happens by the gravity flowing principle, in that waste water/sewer runs from the sources and continuous through inlets via the infrastructure comprising pipes and manholes influenced by gravity and on to the outlet. In special cases pumps are used to overcome differences in height.

Regarding terminology, it is customary to refer to sewer from wash and shower as grey water, while sewer from toilets is black water. Both are comprised in the notion waste water. This is separate from surface water, which is waste water from roofs and roads, and mainly rain water. Nevertheless, the first part of surface water is often strongly polluted, e.g. from worn asphalt, but gets cleaner as time goes on.

For simplicity, the sewer or masses in the sewer as liquid, even if it may comprise fixed particles.

The underlying principle of the invention is to create an under pressure, also called vacuum, in pipes, without the use of pumps and with the smallest possible gas phase in the waste current. This is achieved by avoiding that pumps and manholes are emptied completely for liquid, typically by providing them with closing valves.

When sewer flows through a sewer system according to the invention, there is generally a through running gas free column of sewer, in that the column preferably comprises as many pipes and manholes as possible. The larger fall that is achieved in the column, the bigger the suction occurs and the lager through current is achieved.

It is desirable to guide flow to tanks and from such tanks to let the output out in the pipe system without air with it. This is done by equipping the tank with a closing mechanism, such as a motor operated valve, a magnetic valve, and similar. Air and other gases inside the system is prevented by the tank not being completely emptied, but that liquid level always stays above a minimum level, and preferably above a maximum level. Equipment is fitted to measure the level of liquid in the tanks and the manholes and possibly configurations that enables motion before the tap is opened, e.g. by letting out compressed air in the bottom, or a screw or other movement arrangement is activated. This is to ease the flow of the liquid in the pipe system, if this is necessary.

If it is desirable to empty the tank completely, a cistern is installed above the tank and flushes a certain amount of clean water as the tank is emptied. The tap is closed before all of the clean water has run out. The advantage with this is that the tap and part of the pipe network out of the tank then stays with clean water and this reduced the risk of sedimentation in tank, tap and pipes. Further on pressure sensors are installed in the sewage system and in the tanks and a control unit supervises and controls valves and arrangements that empty the tanks.

The control unit can in addition provide for the under pressure in the sewer system not getting too high, in that air is let in via separate taps that are installed on the sewer pipes. In the same way, the under pressure in different sewer pipes that collect in a larger sewer pipe can be adjusted so to keep an even and controlled under pressure in the complete construction and in this way prevent pressure differences resulting in liquid being let into a manhole that is opened in order to be emptied.

There are at least three ways to adjust water levels:
To let gas, typically air, into the pipe, as mentioned above. This is a very efficient way to moderate the water flow because it gives the water a whirling motion. The technical effect is to reduce the pressure difference between the place where the gas is let in and the outlet, since gas alters its volume during pressure changes.
To adjust taps at the same time as pressure is measured. The technical difference is then to alter the resistance to the current.
To alter maximal/minimal levels in the tanks. Higher maximal level gives bigger under pressure and more liquid through the system. The technical effect is then to alter the pressure difference between the inlet and outlet. This method is not dependent on supplying gas.

The same principle can be used to drain water away from hard surfaces (surface water from streets, market squares, airports or similar). The tight tank is replaced by a tank having an opening comprising a sand trap to prevent sand, gravel and other undesirable particles arriving in the tank. The surface water is guided in a separate surface water network which is guided to a free outlet called recipient 190 (river, ocean and similar), in the same way as the sewer is guided in its own network to a cleaning plant. The surface water can also be guided to a basin and where the water fall further can be utilized in a power plant.

One or more of all the manholes may have two outlets, one to each of the surface water network and the sewer network. In this way one can in an emergency situation choose where to guide the water. On the other hand, if there is a need for flushing the sewer network with clean water, this is simple.

The installation can also dampen power peaks, as in the morning when all are going to the bathroom and the installation is working at full by the tanks being emptied continuously until the under pressure in the pipe network has reached its maximum limit, at this point the installation starts accumulating liquid in the manholes so that the under pressure does not increase any longer. When the maximum load is over, the tanks are again emptied. Provided it is not raining and water is not running in the surface network, one can also perform repair or maintenance of the systems while intermittent storing of the water/sewer in alternative tanks/manholes.

Because a system built as an under pressure construction may transport much larger amounts of liquid with smaller pipe dimensions, the capacity can be increased on existing constructions without exchanging the old pipe construction by slipping new pipes having a little smaller dimension into the old pipe construction. With new installations, one may save on the pipe construction because or smaller dimensions that are more cost effective when purchased and during layout. This is not the least because it is not necessary to lay out gravity flow, but may lay out the pipes with counter fall over smaller heights. In this way one may eliminate the need for blasting when coming upon rock.

Closing valves are installed on every pipe stretch so that by damage to a pre branch, the valve is closed automatically so that air is not sucked into and ruining the under pressure on the rest of the installation.

Sewer System

Figure 3:
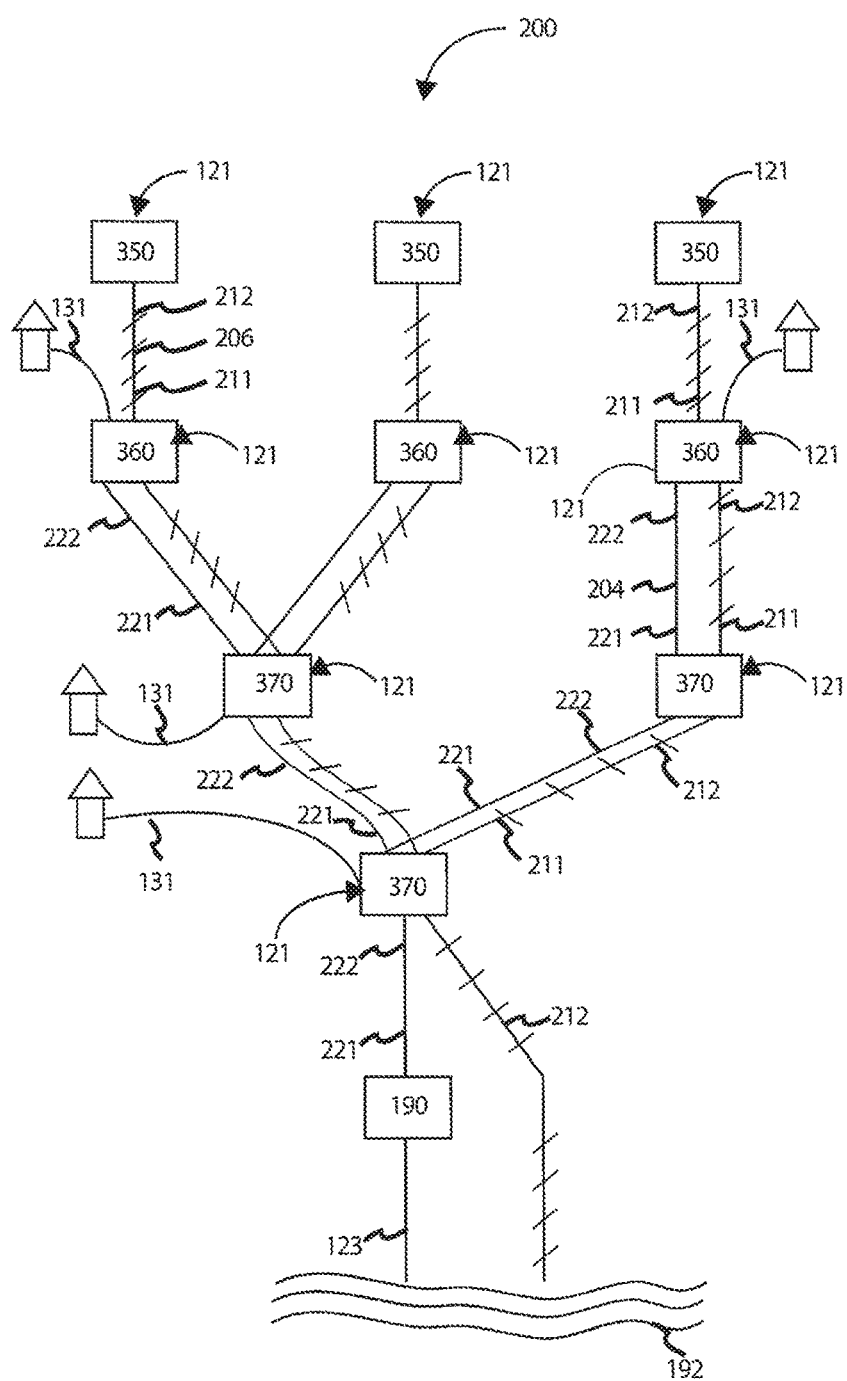

The embodiment of the sewer system 200 according to the invention presented in FIGS. 3, 4*a* and 4*b* comprises manholes 350, 260 and 370 and pipes. Even if the principle will operate with a manhole with a connected pipe, the efficiency will increase if as many as possible of manholes form a series connected column of sewers.

Hoses, pipes or manholes may have a limit on the under pressure they can endure. One may safeguard for this by letting in a little air.

In a preferred embodiment the inlets of the system are prepared to the principle of gravity flow, so that there is no need to make alterations in the different buildings from which the sewer has its origin. The inlets guide the sewer to highest upstream manholes and therefrom down to the cleaning plant is used a full current solution.

Some buildings, typically larger industrial buildings, are equipped with full current gully. When this is the case, such can advantageously be used and connect inlets from full current gully directly into the parts of the sewer system that are run under the full current solution. This increases the efficiency further. Nevertheless, air is let in when the roof is drained down to below the air lock of the gully. It may therefore be an advantage to let this water flow via a manhole that is controlled by the sewer system before allowed into the full current pipe.

From the lower manhole which then is closest to upstream from the cleaning plant 190 is just one pipe 221, 222 for sewage/surface water directly to the recipient 192.

The reason is that with this solution one may send surface water on the outside in a pipe 211, 212 for surface water directly to the recipient 192. In this way, unnecessary strain on the cleaning plant is avoided when cleaning is not needed.

Manholes

In a preferred embodiment, multiple different manholes are used. A first type called upstream manhole for surface water 350 is used for one or more sources of surface water, and is furthest upstream in the sewer system. Another type is called upstream manhole for waste water 360 standing right downstream from these and also receives waste water from waste water sources like e.g. houses. A third type called downstream manhole for waste water stands downstream from these and may be serial connected with more of this type towards the outlet of the whole sewer system, typically a cleaning plant.

FIG. 5A presents an upstream manhole for surface water 350 comprising an inlet 211 for surface water from one or more sources of surface water, like outlet in the road. This has an outlet 212 guiding surface water in a surface water pipe in an existing pipe, as presented in FIG. 5AX, in which the existing pipe is used for waste water.

Figure 5B:
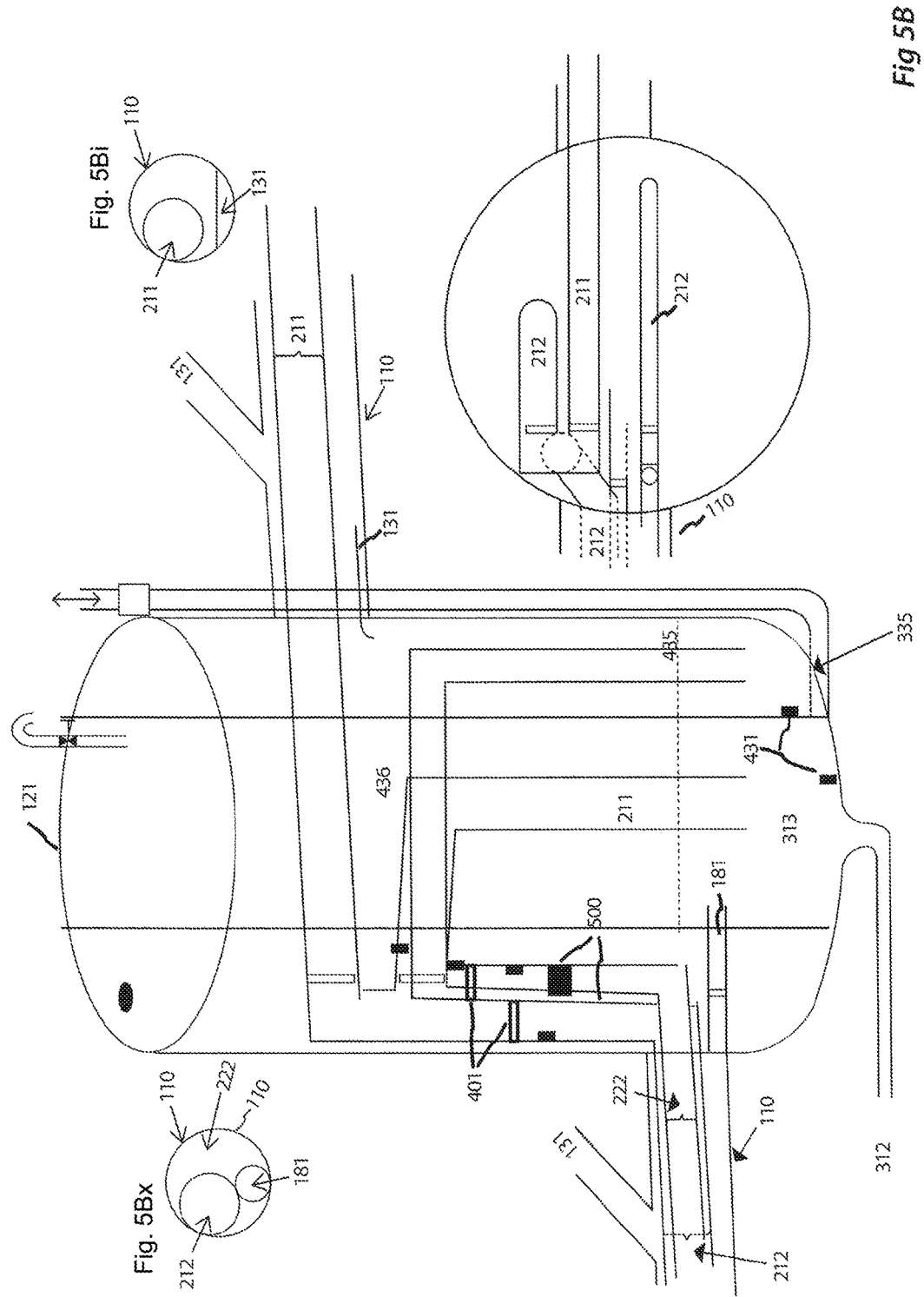
Figure 5F:
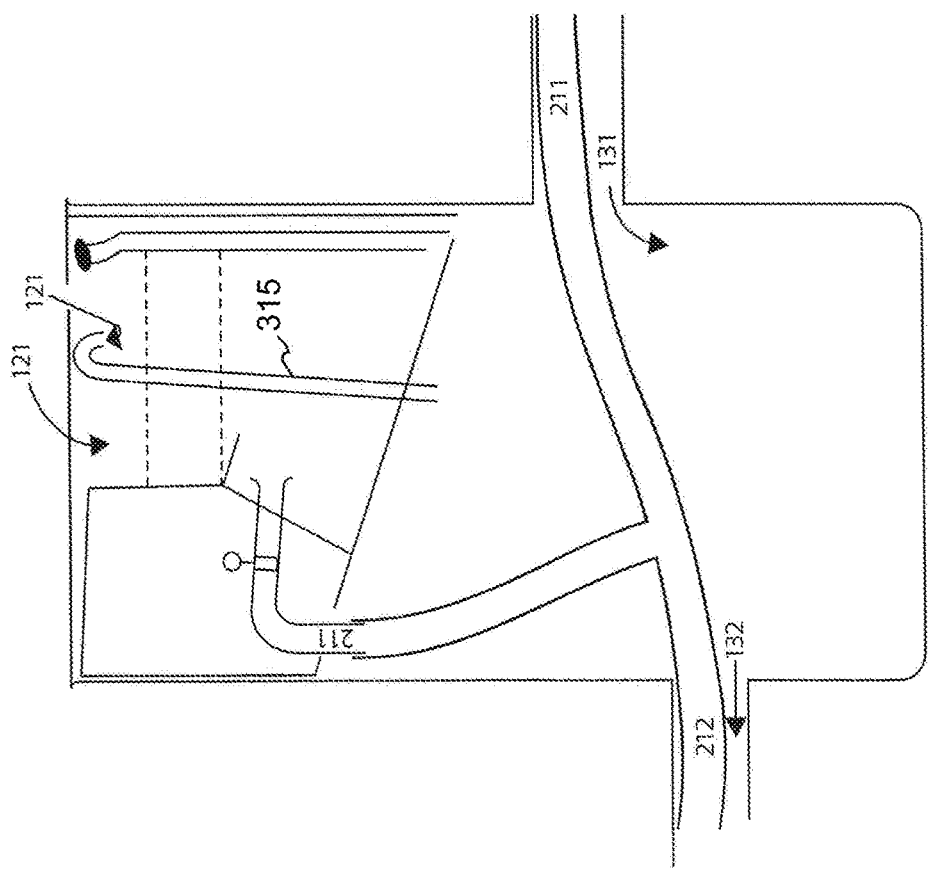

FIG. 5B presents an upstream manhole for waste water 360 comprising an inlet 211 for surface water from one or more upstream manholes for surface water 350, in addition to waste water from one or more sources of wastewater such as houses, as shown in FIG. 5BI. This manhole has an output guiding surface water in a surface water pipe 212 and waste water in a waste water pipe 222 in an existing pipe 110, as presented in FIG. 5BX, where the existing pipe is used to further sources of waste water downstream.

FIG. 5C presents a downstream manhole for waste water 360 comprising an inlet 211 for surface water from one or more upstream manholes for surface water 350 in addition to waste water from one or more sources of waste water such as houses in the original pipe as well as in a waste water pipe, as presented in FIG. 5CI. This manhole has an outlet guiding surface water in a surface pipe 212 and waste water in a waste water pipe 222 in an existing pipe 110 as presented in FIG. 5CX, in which the existing pipe is used for further sources to waste water downstream.

The difference between an upstream manhole and a downstream manhole is shown in the cross sections of the intakes, in FIG. 5BI and FIG. 5CI, while downstream manholes are configured to receive waste water and surface water from upstream manholes and other downstream manholes.

In a preferred embodiment the manholes are split in two chambers or floors, comprising a lower floor for sewage and an upper floor for surface water, or there may be two or more chambers side by side. These form two or more separate circuits for sewer where one, these may be according to the present invention and directed to a full current solution.

In one further preferred embodiment the upper floor for surface water may be configured to float over the surface water down to the lower floor. This is shown in FIG. 5D. In this way it is possible to handle still bigger amounts of precipitation by utilizing the capacity also in the sewer system. The solution of overflow is simple, does not necessary require control devices and is therefore reliable. Surface water in sewage is usually not desirable, in that it is in effective regarding cleaning and may result in overload in the cleaning plant. Nevertheless, this is usually a preferred solution compared to letting areas under water.

In yet another preferred embodiment, the upper floor is directed to empty surface water down to the sewer when precipitation starts. When rain initially starts, the rain water will empty considerable amounts of pollution down into the surface water drain. Such pollution may be asphalt particles and other impurities which is desirable to clean, but after a period of time, the surface water will be cleaner and not needed for cleaning. Such a two parted manhole with a control unit for transfer of surface water to sewer will easily solve this environmental problem.

In still another preferred embodiment, the upper floor for surface water may be configured to shut off surface water and prevent it from flowing down into underlying sewer manhole provided the amount of surface water turned out to be larger than the surface construction was prepared for. In this way, the manhole operates like a non-return valve and prevents the water to penetrate basements via the sewer pipe. This is a big and expensive problem in many old installations.

Sewer Manhole for Houses

Sewer manholes for houses constitute the part of the sewage system that is in the outermost peripheral of the system and receive different kinds of sewer from the producers of the sewer. Such examples are shown in FIG. 6a and FIG. 6b.

From experience one know that sewer from a house comprise much different material, among these sand, abrasive cleaner, soap, foreign elements like remains of cloths and toys. Much of this can get struck in the system, particularly the outmost parts of the system. It is therefore desirable to install a grinding mill at the manhole intake of sewer manholes for houses, so that foreign elements do not cause blockage later in the system.

One has also found it advantageous if the outlet of such a manhole to a pipe downstream is arranged towards the bottom in the manhole and with a valve. In this way the amount of sewage can be allowed to rise until a predetermined level before the valve is opened. In this way deposits can be washed out and gases excluded from the pipe downstream from the valve. This results in that one does not have to empty gratings at individual users and may instead perform emptying at more central gratings as described previously.

Such a grating can also be arranged with a cistern for flushing and/or adding gas, such as air, to avoid to large an under pressure.

A valve in such manholes can be of different kinds. In preferred embodiments is used a valve body, e.g. a ball, that in a lower position closes the inlet of the manhole. The valve body and the outlet constitute the valve in the manhole. The valve body can be implemented in a material or form so that it has a buoyancy that lifts it up from the outlet and therefore opens up for emptying. The valve body may further be arranged with a floating body fastened to the valve body, to ensure high reliability by releasing the opening of the valve. The valve is directed so that when the manhole is being filled to the upper level, the buoyancy of parts of the valve triggers opening of the valve.

FIG. 6a presents schematically a sewer manhole for houses according to the invention with a buoyancy valve, where buoyancy in liquid triggers opening of the valve. In a preferred embodiment, means are utilized to hold back the triggering, here illustrated with magnets. In addition, the magnets contribute to the ball being positioned for best possible closing of the valve when the level of liquid sinks and the whole tank is emptied.

In a preferred embodiment, the triggering of the opening of the valve happens when the floating body pulls the valve body up from the outlet.

FIG. 6b shows schematically a sewer manhole with motor valve for houses according to the invention. This embodiment is advantageous in combination with sucking in with the Venturi effect, in that the Venturi pipe is operated as a full current pipe before the motor valve opens up for emptying.

In a preferred embodiment, the opening of the valve can be triggered by the buoyant body activating a means for freeing the valve body from an attachment, in that the valve body by its own buoyancy then lifts itself up from the outlet.

In a preferred embodiment, the opening of the valve can be triggered by the buoyant body extracting a splint from the fastening between a pole 321 from a valve control unit and the valve body, in that the valve body by its own buoyancy then lifts itself up from the outlet. This results in, even if the motor valve should fail, the valve body will open the valve and thereby prevent overflowing of the manhole.

In both embodiments, the manhole is preferably equipped with arrangements to steer the ball, here shown as poles that prevent the ball from coming out of position, but guides it in a vertical track.

Pipes

In order for the invention to operate, it is necessary having pipes that let in least possible gases. Old pipes may not be suitable for the purpose. One solution is to slide a smaller pipe through existing sewer pipes, and e.g. use the smaller pipe for surface piping with the full current principle, while the rest of the cross section in the sewer pipe is used for sewer. Alternatively, new sewer tanks can be installed inside or by the houses and new pipes can be installed for sewer according to the full current principle. Then the old installation is used for over water, roof-water and drain water.

Control Unit

A control unit supervises the under pressure in all the sewer installation and controls all valves in tanks in addition to measuring liquid level in each tank and calculate current liquid amount, remaining volume in the tank and the speed with which the tank is filled. When little liquid is running in the installation, the tanks are filled up to a level e.g. 50%. The installation distinguishes between tanks that are emptied without the use of under pressure (as a gravity flow system) and tanks that require under pressure for emptying (the outlet is placed without fall or with counter fall). When a tank is to be emptied, the control unit will attempt to empty more tanks concurrently even if they are not full for in this way to add as much liquid to the installation that sufficient under pressure is achieved, so that also tanks with counter fall can be emptied. The tank is just emptied to a minimum level so that air is not let into the installation.

When much liquid is running in the installation, the valves must be open and control so that the liquid level in the tanks is somewhat above the minimum level. If the under pressure increases to a limit that is threatening, the installation will start to accumulate liquid in the tanks until the "flood-crest" is over and thereafter reduce the level in the tanks until the minimum volume. If the under pressure still increases, all valves should let air into the sewer pipes and the capacity sinks and pipes are prevented from breaking.

A control unit may also be used to control one single manhole by stalling the emptying of a manhole until there is sufficient waste water or surface water in the manhole to run the pipes as gravity flow pipes.

In one particularly advantageous embodiment, the emptying of waste water in a manhole is ended by flushing this with surface water or when there is no more waste water, open up for surface water within the waste water pipe before the downstream valve gets closed by the controlling unit. The technical effect by this is to fill up the waste water pipe with surface water that typically is cleaner than waste water. In this way sediments are avoided and impurities like cloths lost in the sewer is prevented to block a valve from complete closing for non-intentional emptying of the waste water pipe. This also eases inspection of the pipes since they are kept cleaner than with the traditional solution of today.

It is also advantageous that the control unit directs the initial surface water into the waste water pipes as it can contain significant amounts of impurities.

The control unit is particularly advantageous when synchronizing groups of manholes and valves. In the following example, a sewer system is to be controlled with a manhole 300, in that the inlet 221 of the manhole 300 is connected to at least two manholes 300' upstream, in that each upstream manhole comprises at least one pipe, in that the pipe is operatively connected to the outlet of the manhole, at least one valve, in that the valve is connected to at least one of the manhole or the pipe upstream, in that the method further comprises opening valves upstream until the pipe operates as a full current pipe, and to close valves when the liquid sinks below a lower level in the respective upstream manhole.

The technical effect of this is that one may drive large parts of the sewer system as a full current pipe and thereby maintain a considerably higher capacity than with the gravity flow principle. With such a long liquid column, a powerful under pressure emerges that will increase the capacity.

System

Figure 7A:
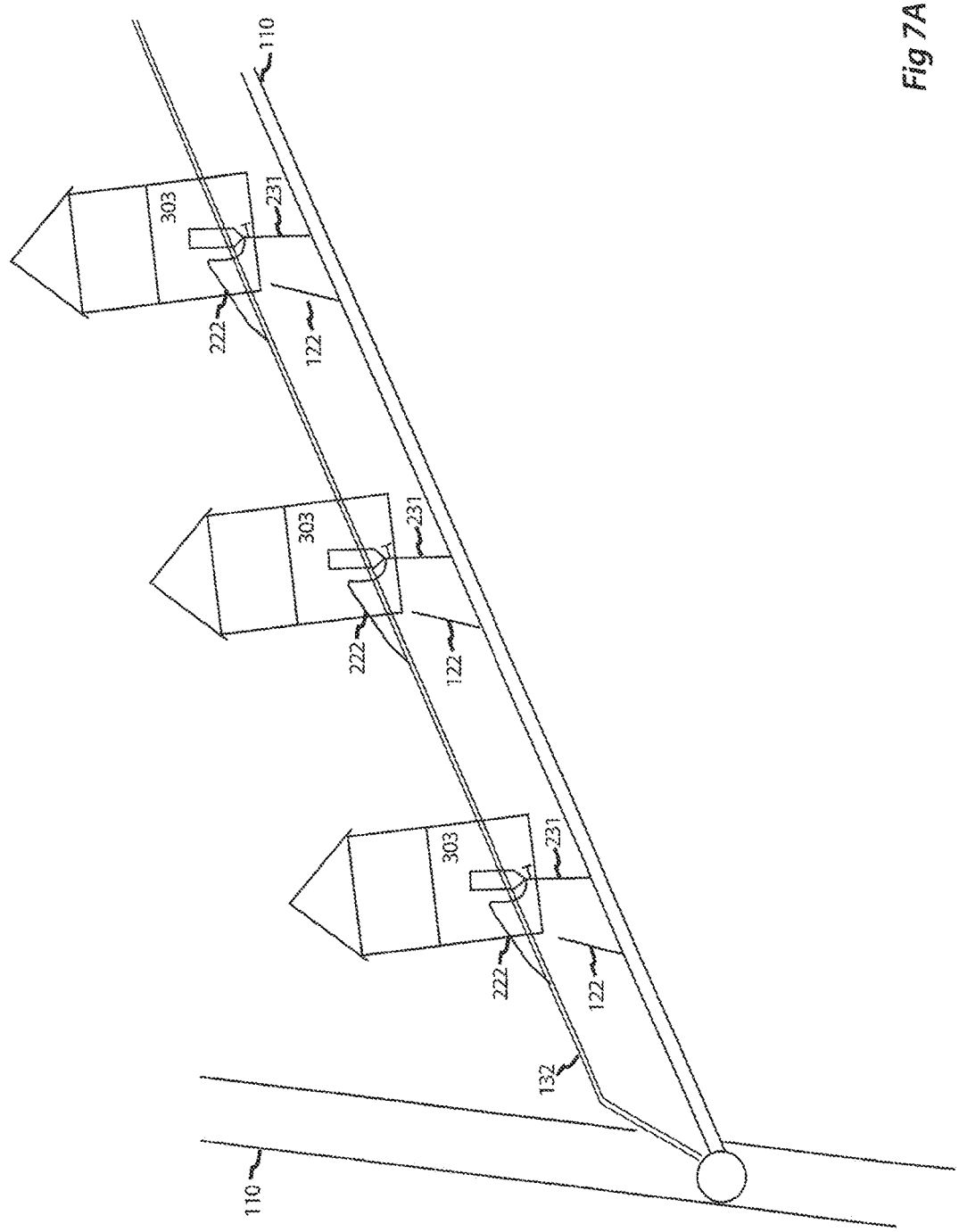

FIGS. 7a, 7b and 7c reveal examples of sewer systems from a number of houses to an installation.

FIG. 7a shows a system in which a group of houses are connected to the waste water network with a waste water manhole for each house, in that the waste water network uses full current pipes. A surface water network operates with gravity flow pipes and both pipes are connected to a common conductor for wastewater and surface water.

FIG. 7b shows another system in which a group of houses are connected to the waste water network with a waste water manhole for each house, in that the waste water network uses full current pipes. A surface network operates with full current pipes and both pipes are connected to a common conductor for waste water and surface water. A hose between the common conductor and the surface water network ensures that liquid is remaining in the surface water network so that a mainly gas free liquid column is maintained.

In one embodiment, a waste water manhole, possibly comprising a sand trap, arranged between the waste water network and the common conductor.

FIG. 7c shows a system in which a group of houses are connected to the waste water network with a waste water manhole for each house, in that the waste water network uses existing old common conductor. A surface water network operates with full current pipes in new pipes and both pipes are connected to a common conductor for waste water and surface water.

In an alternative embodiment the manholes are parted with separate manholes for surface water and sewer, these separate manholes being arranged side by side within an existing manhole, or put inside as a replacement for the manhole.

In an alternative embodiment, constrictions can be arranged on the pipes in order to apply the Venturi principle on parts of the system. In this way, a local under pressure may be created that may suck up further drainage.

Figure 8:
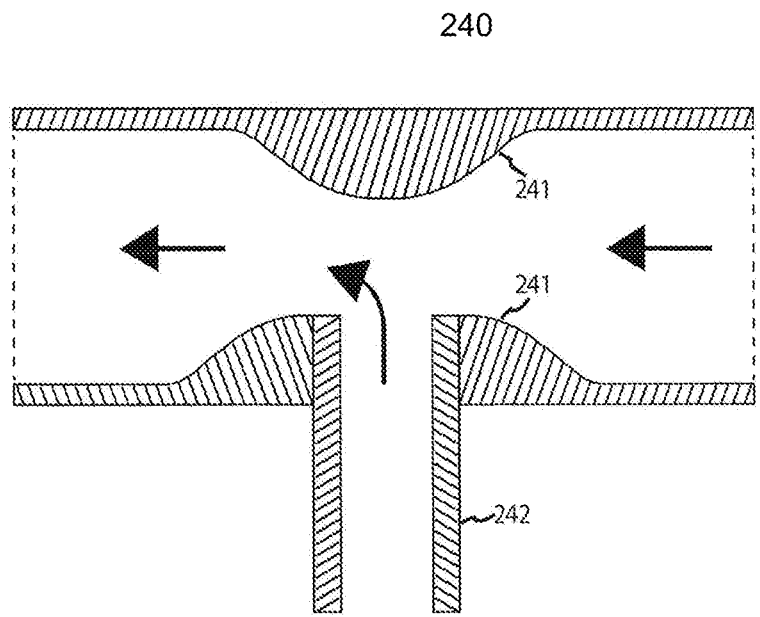

This may in practice be done as shown on FIG. 8 by the pipe 210, 240 being arranged with a constriction 241, the constriction creating a Venturi effect when liquid is flowing through the narrowing. Further, the constriction is arranged with a suction pipe 242 so that more fluids can be sucked up by means of the Venturi effect.

The technical effect of this is that at flow of fluid through the pipe will generate a sucking effect without the use of a pump with moving parts, and instead gives a technically simple and at the same time efficient solution. When the pipe operates as a full current pipe, the Venturi effect will be particularly effective.

The Venturi effect can be utilized in several methods according to the invention.

In a first method, the Venturi effect is used to empty a manhole by sucking. In this case it is important that the upstream volume along the pipe for the constriction is sufficient to empty the manhole upstream from the sucking pipe, alternatively that there are pumps that may keep the last mentioned manhole lower than the maximum level for filling.

In a second method, the Venturi effect is used to start full current flow also through the sucking pipe. This may be achieved provided there is sufficient under pressure, e.g. by the gas free column with liquid stretches far enough below the level of the upstream manhole from the sucking pipe.

The sucking pipe is in a preferred embodiment equipped with a valve.

It is an advantage that valves in the system opens after the liquid level in the manholes have risen above the minimum level, preferably when the liquid level is closer to the maximum level, so that a gas free liquid column is quickly established in the pipes which then become full current pipes.

FIG. 9 shows a manhole with a buoyant valve in the form of a ball, that in closed condition rests on the outlet pipe from the manhole. The ball is kept down in place, partly with the help of gravity and partly due to the under pressure in the sewer system. When the liquid level in the manhole gets above a certain level due to form and buoyancy of the ball, the uplift will override the power that keeps the ball down, and the float valve will open. When the output is down most, mud and possible foreign substances will quickly be flushed out of the liquid column in the manhole and sucked out by the under pressure caused by the liquid column downstream. When the liquid level sinks, the ball will get placed on the outlet pipe and the float valve will then be closed. This happens before the liquid level is so low that gas enters the output pipe, which would otherwise have reduced the effect in the full current pipes.

It is also an advantage to equip the manhole with a free floating float fastened to the ball so that the first mentioned can add extra power for loosening the ball. This is in order to avoid possible mud to be in place over the ball and then pressing it down and preventing the valve from opening. A free floating valve will keep in the surface of the liquid and avoid this problem.

For gravity flow systems, it is desirable that there is a continuous fall from manholes all the way down to the purifying plant. In those cases that one has counter fall, i.e. that liquid must flow upwards to reach the purifying plant, it is customary to insert a pump in order to reach over the height difference.

With the present invention, it is possible to achieve counter fall without the use of pumps. FIG. 10 shows schematically such a sewer system with counter fall. By maintaining a local gas free liquid column all the way down to a point well below the lowest point on the belly of the pipe as shown, the system will function as a siphon and suck the liquid over the height difference and further down to the cleaning plant.

It is important that the liquid column is as gas free as possible, because gas, contrary to liquid, can be compressed. This implies that too much gas in the liquid column will prevent the siphon principle to function. In order to achieve this, a valve arranged lowermost in the local liquid column is used, and when this is opened, the local liquid column gets connected with a downstream liquid column and a longer effective liquid column in full current pipe is achieved.

Under some circumstances like repair and installation, it may be necessary to empty such a pipe length for liquid. Thereafter, the pipe should be filled with liquid and gas removed, e.g. by filling of liquid from a stand by tank at a high level, well above the peak point of the counter fall. This may in a preferred embodiment be a manhole for surface water.

FIG. 11 schematically shows a complex sewer system with circuits for black water, gray water/surface water and environmentally toxic materials. Several valves between pipes, manholes and ventilation in addition to valves along pipes for sewer and surface water, control the liquid flow and maintain gas free liquid columns in gravity flow pipes. Additional pipes between black and grey water manholes are equipped with taps that normally are closed. Provided e.g. maintenance is done on the surface water network, the surface water manholes may be used to collect waste water in a shorter period. This gives a higher flexibility in the system than with prior art techniques.

Sensors in surface water manholes register pollution in the manhole and controls valves so that the polluted liquid is guided to a common manhole for environmentally toxic materials or to a reserved chamber in a tank.

FIG. 12 schematically shows a sewer system with pipes for pipe-in-pipe. During operation, the pipes may be subject of large forces and it is then desirable to place pipe-in-pipe in a mechanical stable way at the same time as it is desirable to guide pipe-in-pipe within existing pipes in a simple way.

According to the present invention, one has arrived at a solution in which pipe-in-pipe, or the inner pipe, is connected with a hinged lifting arm to conveying means like wheels or runners. The inner tube is drawn forwards with the hinged lifting arm in a folded position forwards within the existing pipe. When the inner pipe is correctly placed, the inner pipe is kept fast and at the same time a straining line connected to a hinge in the hinged arm is stretched. In this way the lifting arm is strained out and the inner pipe is strapped to the roof inside the existing pipe.

In this way, the inner pipe is kept in a mechanically stable position, and at the same time is lifted out of the way for liquid that flows along the bottom of the existing pipe. This also makes maintenance simple, in that the inner pipe easily can be drawn out by unstraining the straining line.

Many variations can be foreseen in the above. As an example, it is desirable to avoid building up too much sand and other fixed particles as mud in the manholes. This can be solved in different ways.

Because the present invention provides a bigger suction than traditional gravity fall systems, the extra suction can be used to remove sand and deposits simply by sucking it out with big under pressure and powerful flow.

In addition, the manholes may be equipped with assemblies that set the deposits in motion before a valve is opened to start the emptying of the manhole. Such assemblies may be means for letting out compressed air in the bottom of the manhole or some other stirring assembly.

In addition, the manholes may be equipped with sand traps with screw in order to lift out deposits. This can be as an alternative to the above solutions or as a supplement to assemblies that set deposits in motion, if these do not manage to whirl up all deposits or if some deposit is not desirable to transport downstream. The manholes may be equipped with a sucking pipe that either is terminated underneath the lid or leads to a parking area suitable for a sucking car that connects to the sucking pipe and empties the manhole of mud.

Also manholes other than those directly connected to houses may be equipped with a grinding mill, as shown in FIG. 6.

Manholes comprise typically one part 320 for surface water and one part 340 for waste water. When such a manhole is to be connected to a similar manhole upstream, the parts 320, 320' for surface water should be connected together and the parts 340, 340' for waste water should be connected together, without waste water and surface water being mixed together.

This may preferably be done by the waste water running through existing pipes, while the surface water runs in a pipe in pipe arrangement 200' being stretched through the existing pipe 200.

Because manholes according to the invention comprise many features that are new with regard to traditional manholes, it is advantageous to arrange a technical room for some parts like controlling units, electronics, backup power source, connections for air, sucking, flushing, generators generating power to operate the electronics in the manhole and more. Because some problematic gases are produced in connection with a sewer, it is advantageous to shield technical equipment and support personnel from such gases. An example is, among others, hydrogen sulfide, which is both toxic and corrosive.

With long and continuous liquid columns, considerable liquid flow and water fall, this may be utilized in a turbine, e.g. arranged at the intake of the cleaning plant. Such micro power stations can also be arranged longer upstream and used to regulate power and speed in the liquid flow. This can be an alternative to letting air into pipes to dampen the full current effect.

One may within the same inventive concept use more components with advantageous results.

Storm water manholes can receive large amounts of waste water in a short time and delay the outlet in order to prevent overload of the system downstream. More such may be used in parallel and in series and may optionally be controlled to keep the downstream capacity optimal.

Figure 13:
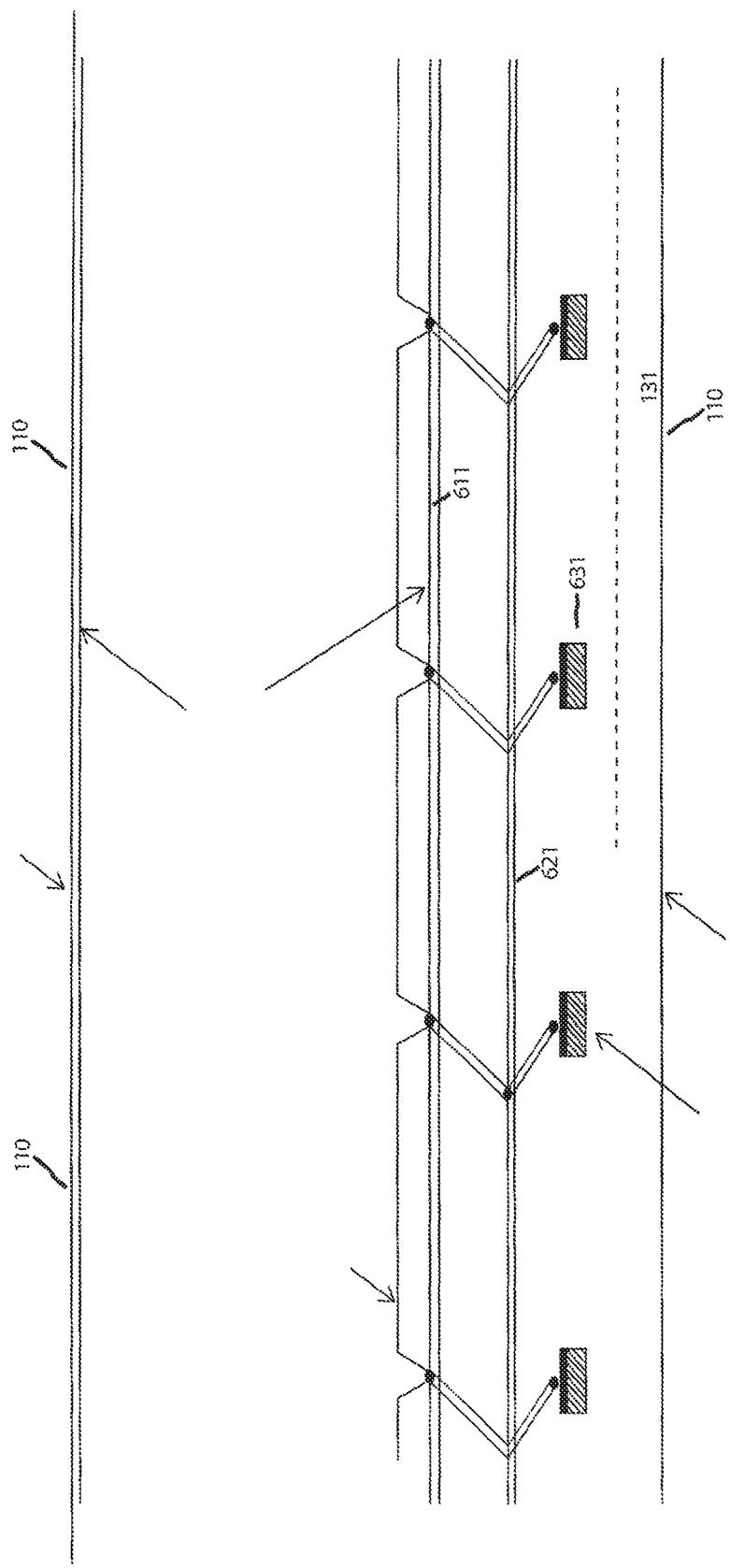

Full stream manhole is presented in FIG. 13. This manhole converts gravity flow to full current and it is an advantage that air is let in controlled when the amount of water decays in order to keep the vacuum as long as possible. This relates here to holes or a valve that may be controlled in more ways, e.g. with a float, electronically, etc.

It is an advantage that the pipe rises a little before it starts to fall, then full current is achieved considerably faster due to the fact that less water fall is required above the outlet before vacuum is achieved.

Figure 14:
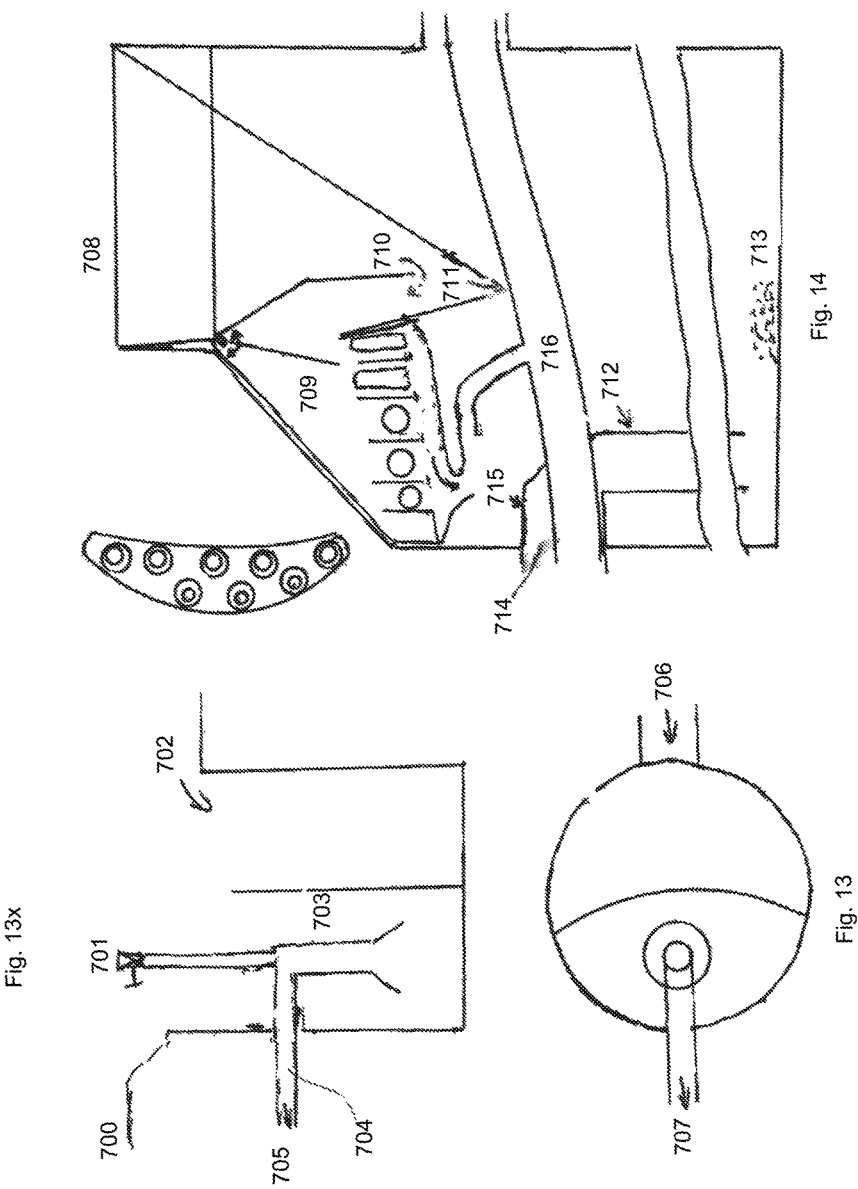

Inset is shown in FIG. 14. A typical area of application here is in sand trap manholes. Here the vacuum manhole is placed and then is connected to the full current pipe that goes through all manholes and to the recipient. Thereafter the funnel liner is positioned, having a small outlet in the bottom through which water and sand is guided down into the existing manhole. The sand is bled off or precipitated and the water flows out as gravity flow through the original outlet. When the amounts of water increase, the water level in the funnel increases and the water flows over into the vacuum chamber. There, a ball or fender will float and the water will flow out as full current. As the amounts of water increase, all the more floats will open and the opposite will occur when the amounts of water decay. The floats will then close evenly and sudden powerful impacts are avoided that otherwise would occur, if just one device for closing and opening was available.

It has proved beneficial to utilize elongated floating bodies as fender for use with boat instead of balls.

Figure 15:
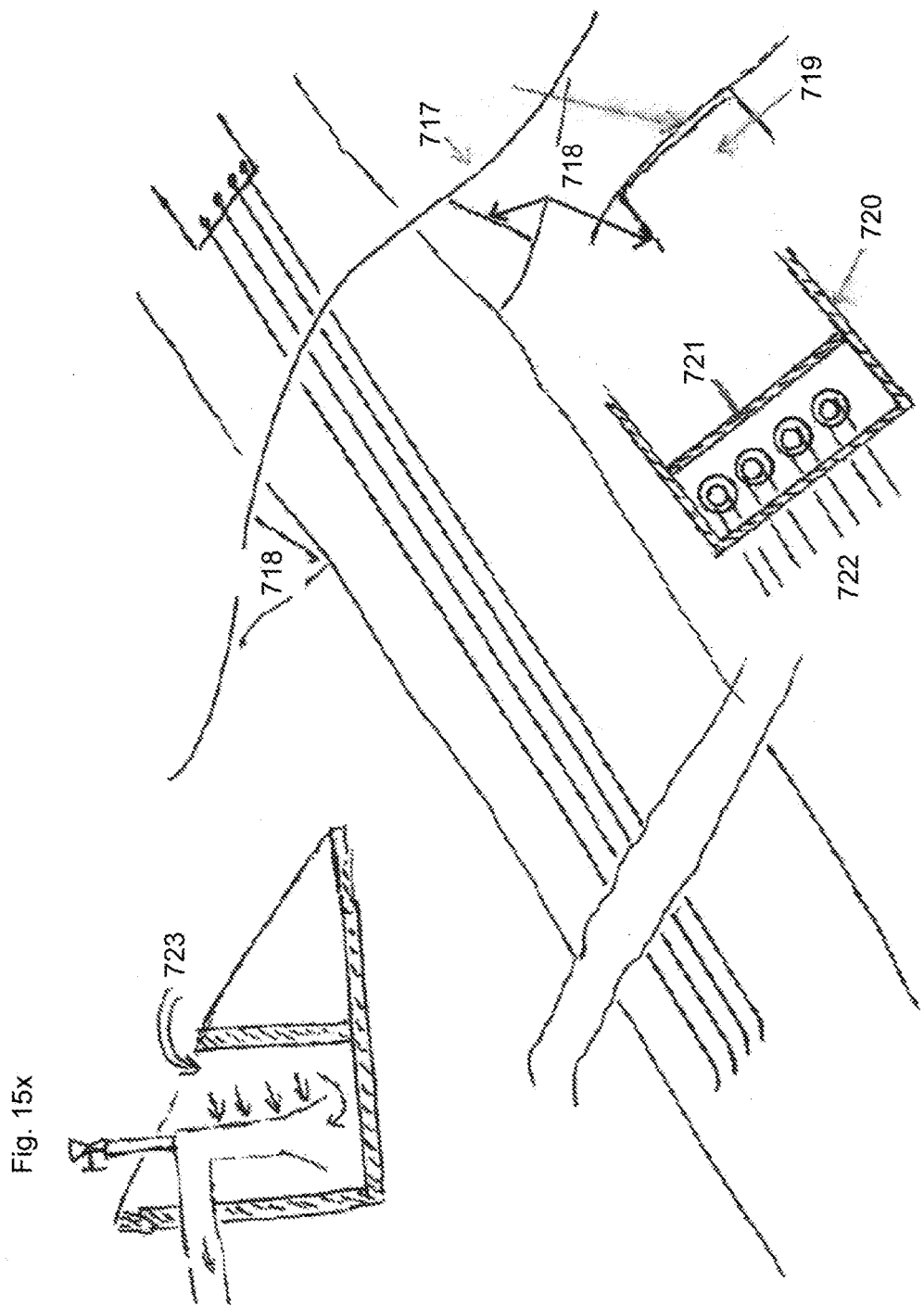

A bridge is presented in FIG. 15. A typical area of use is to safeguarding bridge piers and to reduce the use of increasing the level along parts of a river. Preferably a casting frame made by glass fiber is installed into all water intakes so that the pipes can be connected to this prefabricated intake.

Water is guided in full current pipes past the critical area and out again into the river further down. Here they can have mounted generators on them if desirable. Pipes and intakes must be anchored and weighed down.

The vacuum results in larger water masses can be withdrawn and the water masses can be avoided setting the body of the bridge under water, which then could be subject to powerful current with related strong forces.

Elements for use to heating/melting of snow are shown in FIGS. 16, 17 and 18. Typical areas of use are pavements, football fields, parking lots or collection places for snow where polluted melting water is guided back into the waste water pipe and to the cleaning plant. The one element utilizes the waste water directly and here the water flow is stopped until the water is cooed and in turn is replaced by new hot waste water. Through-flushing of surface water possibly with added chemicals to resist fouling is done as needed.

Heat can be extracted either directly from the waste water running in pipes in the ground, alternatively indirectly with heat pipes in which the evaporation part extends down into the waste water, while the condensation end is arranged in the ground close to the surface.

Heat pipes provide large heat transfer capabilities and disruption of the waste water network is avoided if the pipes close to the surface are damaged. Such a solution can also be utilized on gravity flow systems.

FIG. 17 presents an area of use that may be one pavement for whish is installed three elements sideways, and for which all the liquid in the middle row must be replaced when the temperature approaches the freezing point.

FIG. 18 presents a parking lot where the hatched fields in the corners are areas where the snow from the parking lot gets disposed and melts away. Provided it contains environmentally toxic materials the melted water will be sent back into the waste water pipe and on to the cleaning plant.

The current rate in the system may be adjusted by means of valves, typically motor valves. It is also possible to use supply of gas, typically air, to reduce the vacuum, which again reduces the suction power. A valve can also be combined by the supply of gas.

The invention finds its usefulness with use in sewer systems in order to improve the performance and to remedy peaks in volumes that must be handled in a short while.

It separates existing joint installations in a more simple way by either digging more shallow and utilizing smaller dimensions, and may install new insets in existing manholes.

The invention claimed is:

1. A sewer system comprising
at least one manhole for receiving a liquid from an outlet, the manhole comprising at least one inlet and at least one outlet,
a level gauge register when the liquid exceeds an upper level,
the level gauge register when the liquid sinks below a lower level,
at least one pipe, the pipe being operatively connected to the outlet of the manhole,
at least one valve, the valve being connected to at least one of the manhole and the pipe,
the manhole further comprising at least one first part for surface water and at least one second part for waste water, and the valve, in a closed condition, prevents outlet from the first part of the manhole and prevents gases from entering into the pipe,
the surface water from the first part of the manhole runs in a pipe in pipe arrangement, and
gases do not enter into the pipe when liquids exceed the lower level in the manhole so that a gas free liquid column is established in the pipe which then becomes a full current pipe.

2. The sewer system according to claim 1, further comprising the valve being arranged at the inlet of the manhole.

3. The sewer system according to claim 1, further comprising the valve being arranged at the pipe operatively connected to the outlet of the manhole.

4. The sewer system according to claim 1, further comprising the outlet being arranged with an opening in the manhole at a height below the lower level, so that it is immerged and thereby ensures that gases do not enter into the pipe when liquids exceed the lower level of the manhole.

5. The sewer system according to claim 1, wherein the pipe being operatively connected to the outlet of the manhole is arranged with a constriction, the constriction causing a Venturi effect when liquid flows through a narrowing, the constriction being provided with a suction pipe so that further fluids are sucked up by the Venturi effect.

6. A valve for the sewer system according to claim 1, comprising a valve body attached to a float body,
wherein, when the manhole is filled to the upper level, the buoyancy of the float body assists in releasing the valve for opening of the valve.

7. The valve according to claim 6, the releasing occurring by the float body drawing the valve body up from the outlet.

8. The valve according to claim 7, the releasing occurring by the float body extracting a splint from a fastening between the fastening in the form of a pole from a valve control unit and the valve body, and the valve body by its own buoyancy then lifting from the outlet.

9. A method to control a sewer system according to claim 1,
the method comprising opening the valve when the received liquid exceeds the upper level in the manhole, and closing the valve when the liquid sinks below the lower level in the manhole.

10. A method to control a sewer system according to claim 1, the inlet to the manhole being connected to at least two manholes upstream, each manhole upstream comprising
at least one pipe operatively connected to the outlet of the manhole, and
at least one valve being connected to at least one of the manhole and the pipe upstream,
the method comprising opening valves upstream until the pipe operates as a full current pipe, and closing the valves when the liquid sinks below a lower level in the respective manhole upstream.

* * * * *